(12) United States Patent
Wittig

(10) Patent No.: US 9,976,631 B1
(45) Date of Patent: May 22, 2018

(54) TRANSMISSION SYSTEM

(76) Inventor: Michael Brian Wittig, Santa Clara, CA (US)

( * ) Notice: Subject to any disclaimer, the term of this patent is extended or adjusted under 35 U.S.C. 154(b) by 0 days. days.

(21) Appl. No.: 11/411,990

(22) Filed: Apr. 25, 2006

Related U.S. Application Data

(60) Provisional application No. 60/674,803, filed on Apr. 25, 2005, provisional application No. 60/680,787, filed on May 14, 2005.

(51) Int. Cl.
*F16H 3/66* (2006.01)
*F16H 3/54* (2006.01)

(52) U.S. Cl.
CPC ..................................... *F16H 3/54* (2013.01)

(58) Field of Classification Search
USPC ................................. 475/248, 331, 149, 348
See application file for complete search history.

(56) References Cited

U.S. PATENT DOCUMENTS

| | | | |
|---|---|---|---|
| 3,303,713 A * | 2/1967 | Hicks .............................. | 74/411 |
| 3,402,622 A * | 9/1968 | Matut Archanco ........... | 475/338 |
| 5,751,081 A * | 5/1998 | Morikawa ....................... | 310/83 |
| 6,398,685 B1 * | 6/2002 | Wachauer et al. ............ | 475/149 |
| 7,189,183 B2 * | 3/2007 | Fugel et al. ................... | 475/331 |
| 2003/0153427 A1 * | 8/2003 | Mayranen ...................... | 475/331 |
| 2003/0232692 A1 * | 12/2003 | Chen ............................ | 475/331 |

* cited by examiner

*Primary Examiner* — Derek D Knight

(57) ABSTRACT

A primary objective of the present embodiments is to provide a transmission that may be simple in design, low in weight, and have a reduced cost of manufacture while being capable of a relatively high ratio.

14 Claims, 25 Drawing Sheets

FIG. 15

| Table 400 | | |
|---|---|---|
| z1 | 25 | 49 |
| z2 | 24 | |
| z3 | 23 | 47 |
| z4 | 24 | |
| m1 | 1 | |
| cd | 24.5 | |
| m2 | 1.042553 | |
| r | 0.998264 | |
| | 0.001736 | |
| | 576 | |

| Table 402 | | |
|---|---|---|
| z1 | 26 | 49 |
| z2 | 23 | |
| z3 | 22 | 47 |
| z4 | 25 | |
| m1 | 1 | |
| cd | 24.5 | |
| m2 | 1.042553 | |
| r | 0.994783 | |
| | 0.005217 | |
| | 191.6667 | |

| Table 404 | | |
|---|---|---|
| z1 | 28 | 49 |
| z2 | 21 | |
| z3 | 20 | 47 |
| z4 | 27 | |
| m1 | 1 | |
| cd | 24.5 | |
| m2 | 1.042553 | |
| r | 0.987654 | |
| | 0.012346 | |
| | 81 | |

| Table 406 | | |
|---|---|---|
| z1 | 26 | 49 |
| z2 | 23 | |
| z3 | 23 | 48 |
| z4 | 25 | |
| m1 | 1 | |
| cd | 24.5 | |
| m2 | 1.020833 | |
| r | 1.04 | |
| | -0.04 | |
| | -25 | |

| Table 408 | | |
|---|---|---|
| z1 | 25 | 49 |
| z2 | 24 | |
| z3 | 22 | 47 |
| z4 | 25 | |
| m1 | 1 | |
| cd | 24.5 | |
| m2 | 1.042553 | |
| r | 0.916667 | |
| | 0.083333 | |
| | 12 | |

FIG. 16

| | Table 502 | |
|---|---|---|
| z1 | 7 | sum z1+z2 |
| z2 | 6 | 13 |
| z3 | 5 | sum z3+z4 |
| z4 | 6 | 11 |
| ml | 1 | |
| cd | 6.5 | |
| m2 | 1.181818 | |
| r | 0.972222 | |
| | 0.027778 | |
| | 36 | |
| rpm | 30000 | |
| out | 833.3333 | |

| | Table 504 | |
|---|---|---|
| z1 | 6 | sumz1+z2 |
| z2 | 7 | 13 |
| z3 | 6 | sum z3+z4 |
| z4 | 5 | 11 |
| ml | 1 | |
| cd | 6.5 | |
| m2 | 1.181818 | |
| r | 1.028571 | |
| | -0.028571 | |
| | -35 | |
| rpm | 30000 | |
| out | -857.1429 | |

| | Table 506 | |
|---|---|---|
| z1 | 6 | sum z1+z2 |
| z2 | 5 | 11 |
| z3 | 6 | sum z3+z4 |
| z4 | 7 | 13 |
| ml | 1 | |
| cd | 5.5 | |
| m2 | 0.846154 | |
| r | 1.028571 | |
| | -0.028571 | |
| | -35 | |
| rpm | 30000 | |
| out | -857.1429 | |

| | Table 508 | |
|---|---|---|
| z1 | 5 | sumz1+z2 |
| z2 | 6 | 11 |
| z3 | 7 | sum z3+z4 |
| z4 | 6 | 13 |
| ml | 1 | |
| cd | 5.5 | |
| m2 | 0.846154 | |
| r | 0.972222 | |
| | 0.027778 | |
| | 36 | |
| rpm | 30000 | |
| out | 833.3333 | |

FIG. 17

| Table 602 | |
|---|---|
| z1 | 7 |
| z2 | 6 |
| z3 | 5 |
| z4 | 6 |
| m1 | 1 |
| cd | 6.5 |
| m2 | 1.181818 |
| r | 0.972222 |
| | 0.027778 |
| | 36 |

| Table 604 | |
|---|---|
| z1 | 8 |
| z2 | 7 |
| z3 | 6 |
| z4 | 7 |
| m1 | 1 |
| cd | 7.5 |
| m2 | 1.153846 |
| r | 0.979592 |
| | 0.020408 |
| | 49 |

| Table 606 | |
|---|---|
| z1 | 9 |
| z2 | 8 |
| z3 | 7 |
| z4 | 8 |
| m1 | 1 |
| cd | 8.5 |
| m2 | 1.133333 |
| r | 0.984375 |
| | 0.015625 |
| | 64 |

| Table 608 | |
|---|---|
| z1 | 10 |
| z2 | 9 |
| z3 | 8 |
| z4 | 9 |
| m1 | 1 |
| cd | 9.5 |
| m2 | 1.117647 |
| r | 0.987654 |
| | 0.012346 |
| | 81 |

| Table 610 | |
|---|---|
| z1 | 11 |
| z2 | 10 |
| z3 | 9 |
| z4 | 10 |
| m1 | 1 |
| cd | 10.5 |
| m2 | 1.105263 |
| r | 0.99 |
| | 0.01 |
| | 100 |

| Table 612 | |
|---|---|
| z1 | 12 |
| z2 | 11 |
| z3 | 10 |
| z4 | 11 |
| m1 | 1 |
| cd | 11.5 |
| m2 | 1.095238 |
| r | 0.991736 |
| | 0.008264 |
| | 121 |

| Table 614 | |
|---|---|
| z1 | 13 |
| z2 | 12 |
| z3 | 11 |
| z4 | 12 |
| m1 | 1 |
| cd | 12.5 |
| m2 | 1.086957 |
| r | 0.993056 |
| | 0.006944 |
| | 144 |

| Table 616 | |
|---|---|
| z1 | 14 |
| z2 | 13 |
| z3 | 12 |
| z4 | 13 |
| m1 | 1 |
| cd | 13.5 |
| m2 | 1.08 |
| r | 0.994083 |
| | 0.005917 |
| | 169 |

| Table 618 | |
|---|---|
| z1 | 15 |
| z2 | 14 |
| z3 | 13 |
| z4 | 14 |
| m1 | 1 |
| cd | 14.5 |
| m2 | 1.074074 |
| r | 0.994898 |
| | 0.005102 |
| | 196 |

| Table 620 | |
|---|---|
| z1 | 16 |
| z2 | 15 |
| z3 | 14 |
| z4 | 15 |
| m1 | 1 |
| cd | 15.5 |
| m2 | 1.066966 |
| r | 0.995556 |
| | 0.004444 |
| | 225 |

| Table 622 | |
|---|---|
| z1 | 17 |
| z2 | 16 |
| z3 | 15 |
| z4 | 16 |
| m1 | 1 |
| cd | 16.5 |
| m2 | 1.064516 |
| r | 0.996094 |
| | 0.003906 |
| | 256 |

| Table 624 | |
|---|---|
| z1 | 18 |
| z2 | 17 |
| z3 | 16 |
| z4 | 17 |
| m1 | 1 |
| cd | 17.5 |
| m2 | 1.060606 |
| r | 0.99654 |
| | 0.00346 |
| | 289 |

FIG. 21

| z1 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|
| z2 | 4 | 5 | 6 | 7 | 8 | 9 | 10 | 11 | 12 | 13 | 14 | 15 | 16 | 17 | 18 |
| z1/z2 | 1.25 | 1.2 | 1.16667 | 1.14286 | 1.125 | 1.11111 | 1.1 | 1.09091 | 1.08333 | 1.07692 | 1.07143 | 1.06667 | 1.0625 | 1.05882 | 1.05556 |
| z3 | 5 | 6 | 7 | 8 | 9 | 10 | 11 | 12 | 13 | 14 | 15 | 16 | 17 | 18 | 19 |
| z4 | 6 | 7 | 8 | 9 | 10 | 11 | 12 | 13 | 14 | 15 | 16 | 17 | 18 | 19 | 20 |
| z4/z3 | 1.2 | 1.16667 | 1.14286 | 1.125 | 1.11111 | 1.1 | 1.09091 | 1.08333 | 1.07692 | 1.07143 | 1.06667 | 1.0625 | 1.05882 | 1.05556 | 1.05263 |
| m1 | 1 | 1 | 1 | 1 | 1 | 1 | 1 | 1 | 1 | 1 | 1 | 1 | 1 | 1 | 1 |
| cd | 4.5 | 5.5 | 6.5 | 7.5 | 8.5 | 9.5 | 10.5 | 11.5 | 12.5 | 13.5 | 14.5 | 15.5 | 16.5 | 17.5 | 18.5 |
| m2 | 0.81818 | 0.84615 | 0.86667 | 0.88235 | 0.89474 | 0.90476 | 0.91304 | 0.92 | 0.92593 | 0.93103 | 0.93548 | 0.93939 | 0.94286 | 0.94595 | 0.94872 |
| r | 1.04167 | 1.02857 | 1.02083 | 1.01587 | 1.0125 | 1.0101 | 1.00833 | 1.00699 | 1.00595 | 1.00513 | 1.00446 | 1.00392 | 1.00347 | 1.0031 | 1.00278 |
| 1-r | -0.04167 | -0.02857 | -0.02083 | -0.01587 | -0.0125 | -0.0101 | -0.00833 | -0.00699 | -0.00595 | -0.00513 | -0.00446 | -0.00392 | -0.00347 | -0.0031 | -0.00278 |
| 1/(1-r) | -24 | -35 | -48 | -63 | -80 | -99 | -120 | -143 | -168 | -195 | -224 | -255 | -288 | -323 | -360 |
| (z1/z2)-(z4/z3) | 0.05 | 0.03333 | 0.02381 | 0.01786 | 0.01389 | 0.01111 | 0.00909 | 0.00758 | 0.00641 | 0.00549 | 0.00476 | 0.00417 | 0.00368 | 0.00327 | 0.00292 |

| z1 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|
| z2 | 19 | 20 | 21 | 22 | 23 | 24 | 25 | 26 | 27 | 28 | 29 | 30 | 31 | 32 | 33 |
| z1/z2 | 1.05263 | 1.05 | 1.04762 | 1.04545 | 1.04348 | 1.04167 | 1.04 | 1.03846 | 1.03704 | 1.03571 | 1.03448 | 1.03333 | 1.03226 | 1.03125 | 1.0303 |
| z3 | 20 | 21 | 22 | 23 | 24 | 25 | 26 | 27 | 28 | 29 | 30 | 31 | 32 | 33 | 34 |
| z4 | 21 | 22 | 23 | 24 | 25 | 26 | 27 | 28 | 29 | 30 | 31 | 32 | 33 | 34 | 35 |
| z4/z3 | 1.05 | 1.04762 | 1.04545 | 1.04348 | 1.04167 | 1.04 | 1.03846 | 1.03704 | 1.03571 | 1.03448 | 1.03333 | 1.03226 | 1.03125 | 1.0303 | 1.02941 |
| m1 | 1 | 1 | 1 | 1 | 1 | 1 | 1 | 1 | 1 | 1 | 1 | 1 | 1 | 1 | 1 |
| cd | 19.5 | 20.5 | 21.5 | 22.5 | 23.5 | 24.5 | 25.5 | 26.5 | 27.5 | 28.5 | 29.5 | 30.5 | 31.5 | 32.5 | 33.5 |
| m2 | 0.95122 | 0.95349 | 0.95556 | 0.95745 | 0.95918 | 0.96078 | 0.96226 | 0.96364 | 0.96491 | 0.9661 | 0.96721 | 0.96825 | 0.96923 | 0.97015 | 0.97101 |
| r | 1.00251 | 1.00227 | 1.00207 | 1.00189 | 1.00174 | 1.0016 | 1.00148 | 1.00137 | 1.00128 | 1.00119 | 1.00111 | 1.00104 | 1.00098 | 1.00092 | 1.00087 |
| 1-r | -0.00251 | -0.00227 | -0.00207 | -0.00189 | -0.00174 | -0.0016 | -0.00148 | -0.00137 | -0.00128 | -0.00119 | -0.00111 | -0.00104 | -0.00098 | -0.00092 | -0.00087 |
| 1/(1-r) | -399 | -440 | -483 | -528 | -575 | -624 | -675 | -728 | -783 | -840 | -899 | -960 | -1023 | -1088 | -1155 |
| (z1/z2)-(z4/z3) | 0.00263 | 0.00238 | 0.00216 | 0.00198 | 0.00181 | 0.00167 | 0.00154 | 0.00142 | 0.00132 | 0.00123 | 0.00115 | 0.00108 | 0.00101 | 0.00095 | 0.00089 |

TRANSMISSION SYSTEM

CROSS-REFERENCE TO RELATED APPLICATIONS

This application claims the benefit of the following U.S. Provisional Patent Applications: Application No. 60/674,803, filed on Apr. 25, 2005; Application No. 60/680,787, filed on May 14, 2005, the entire disclosure of each of the aforementioned Provisional Patent Applications is hereby incorporated by reference herein.

BACKGROUND

1) Field

These embodiments relate to transmission systems of the type used to change from an input speed and torque to a differing output speed and torque.

2) Discussion of Related Art

Transmission systems are often used in, for example, electric actuators.

Disadvantageously, transmission systems may require several stages to achieve a desired ratio. These multiple stages may add weight and cost to the transmission.

SUMMARY

A primary objective of the present embodiments is to provide a transmission that may be simple in design, low in weight, and have a reduced cost of manufacture while being capable of a relatively high ratio.

BRIEF DESCRIPTION OF THE DRAWINGS

The embodiments are further described by way of example with reference to the accompanying drawings wherein:

FIG. 15 show five tables of teeth combinations and other values related to the eighth embodiment.

FIGS. 16-17 shows tables of teeth combinations and other values related to the seventh embodiment.

FIG. 21 shows two tables of preferable combinations of teeth (or grooves) and other values.

DETAILED DESCRIPTION

Figure 1:
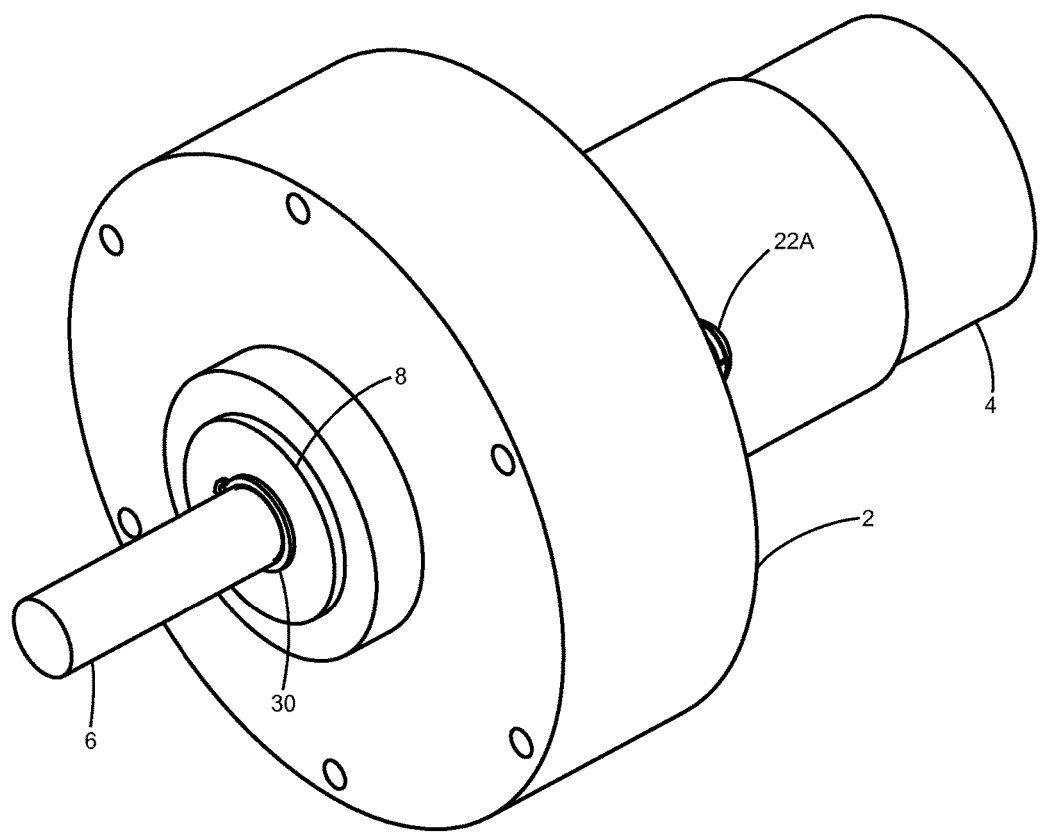
FIG. 1 is a perspective view of a first embodiment.

FIG. 1 shows a first embodiment. An electric motor 4 is attached indirectly to a transmission case 2. Transmission case 2 has a ball bearing 8 supporting a shaft 6. Shaft 6 has a retaining ring 30 fitted to a groove in the shaft for retaining the shaft.

Figure 2:
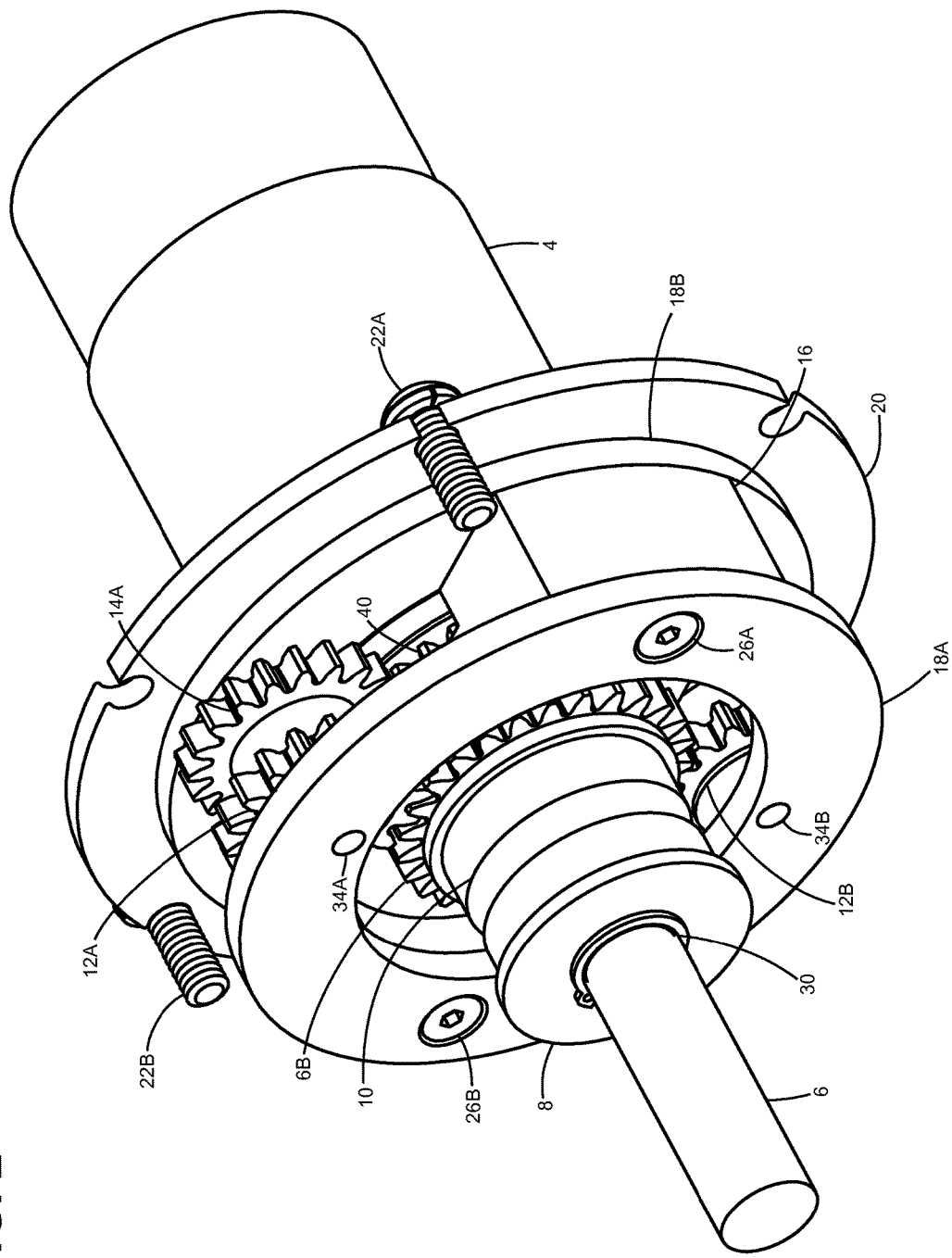
FIG. 2 is a perspective view of the components of the first embodiment shown in FIG. 1 with transmission case 2 removed.
Figure 3:
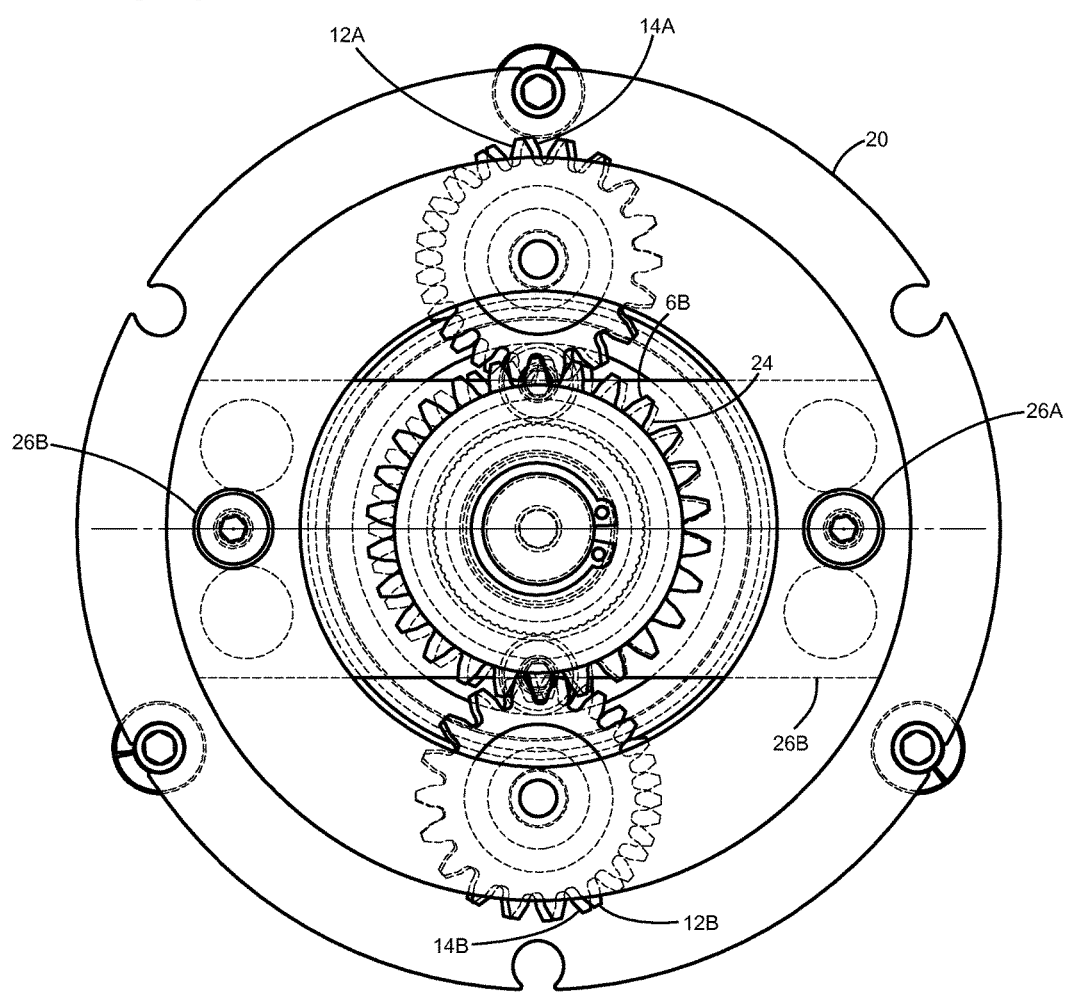
FIG. 3 is a front view of components of the first embodiment shown in FIG. 1.
Figure 4:
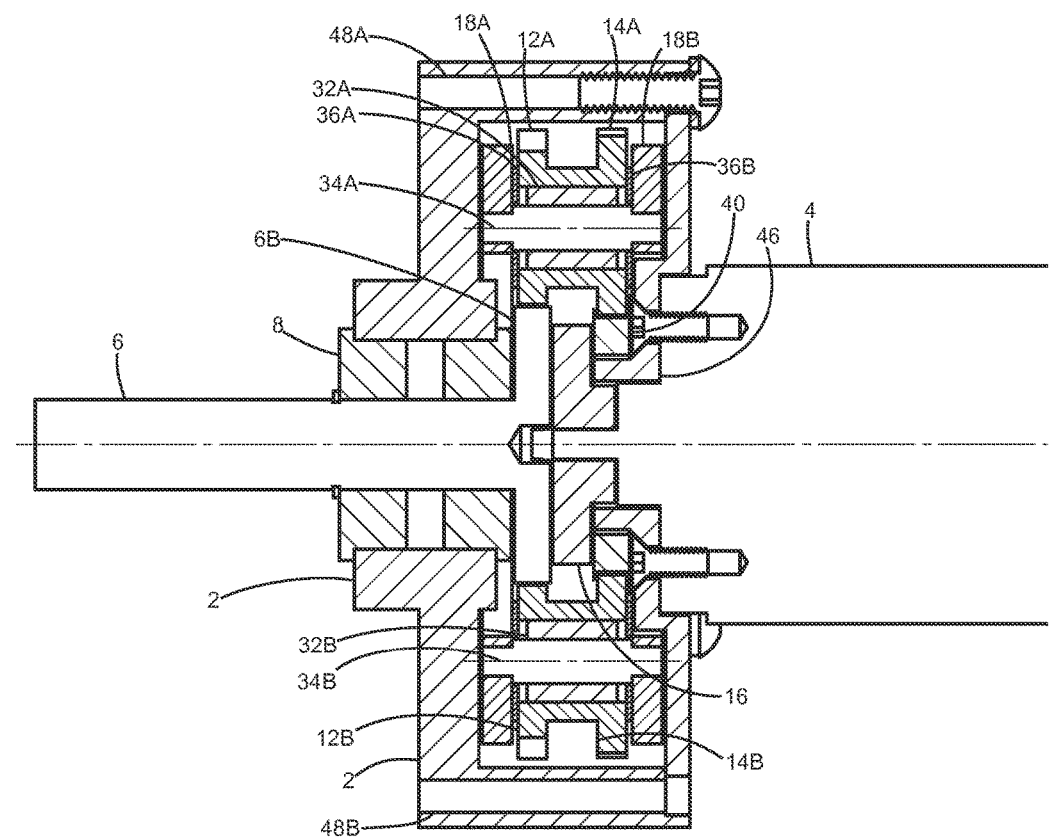
FIG. 4 is a cross-sectional view of the first embodiment shown in FIG. 1.

FIG. 2 shows the embodiment of FIG. 1 with the transmission case removed, revealing several important components. The transmission includes a fixed gear 40, a single piece unit comprised of gears 12a and 14a, and the gear end 6b of shaft 6. Also of importance is an arm or intermediate component 16. Preferably, the gears are made of hardened steel and the rest of the components (besides pre-made components such as bearings and screws) are made of aluminum. The transmission operates as follows: arm 16 is driven by electric motor 4, as it is attached to electric motor 4's shaft. Arm 16 spins concentric to shaft 6. Arm 16 attaches to drive rings 18a and 18b. Drive rings 18a and 18b drive shaft 34a, which has a needle bearing 32a (shown in FIG. 4) running on it and supporting the single piece unit comprised of gears 12a and 14a (the top single piece unit comprised of gears 12a and 14a is only being discussed here, but the bottom single piece unit comprised of gears 12b and 14b is identical in function and construction). Looking at the top half of the transmission in FIG. 4, a sequence of gears is shown connecting the rotating output shaft 6 and fixed gear 40, which itself is fixed to a motor mount plate 42, which in turn is fixed to transmission case 2. Since arm 16 is turned by electric motor 4, arm 16 causes gears 12a and 14a (as one piece) to orbit about the axis of shaft 6. This orbiting motion causes gear 14a to rotate about the axis of shaft 34a. Gear 14a is directly connected to gear 12a because they are a single unit, so they both turn at the same speed. Gear 12a turns shaft gear end 6b, which is part of shaft 6. To get a high ratio doing this, the pitches of the gears are varied.

For purposes of explanation, the following notation will be used:

Z1=# of teeth of fixed gear 40
Z2=# of teeth of gear 14a
Z3=# of teeth of gear 12a
Z4=# of teeth of gear end 6b If gear 40 is fixed, and gear 14a is caused to orbit about fixed gear 40, then gear 14a will rotate. The rate of rotation will depend on the diameters of the pitch circles of fixed gear 40 and gear 14a. Since gear 40 is fixed, rotation of arm 16 for 1 revolution will cause gear 14a to rotate z1/z2 times because z1/z2 is the ratio between the two. In the same manner, the ratio from z3 to z4 is z3/z4. Thus, the total ratio from the fixed gear 40 to shaft 6 will be (z1/z2)*(z3/z4). We can imagine that if the two ratios are numerically close to each other, one being slightly larger than a number X and the other being slightly smaller than the same number X, it would be possible to have the net effect be that the ratio is slightly above or below 1. In effect, we are gearing down (or up) the fixed gear 40. Rotating arm 16 clockwise is equivalent to rotating fixed gear 40 counterclockwise, which means that gear 14a would turn clockwise. Gears 12a and 14a comprise a single piece, such that gear 12a would also turn clockwise. That means the output, gear end 6b, would turn counterclockwise. It follows that a positive total ratio would have the output spinning faster in reverse (i.e., counterclockwise) than the input (arm 16) is spinning forward (i.e., clockwise). One revolution of arm 16 would produce $(z1/z2)*(z3/z4)$ revolutions in the reverse direction at the output (gear end 6b). Thus, the net number of revolutions that the output would make for a single revolution of the input (arm 16) is:

$$1-[(z1/z2)*(z3/z4)] \text{ revolutions.}$$

Equivalently, $1/[1-(z1*z2/z3/z4)]$ revolutions of the input produces 1 revolution of the output—this is known as the ratio of the transmission. Note that if the term within parentheses is greater than 1, the ratio will be negative, meaning that the output is turning in reverse of the direction of the input.

Varying the Pitch of the Gears to Maintain the Same Center Distance

We must maintain the same center distance between the two sets of gears (the first set being gear 40 and gear 14a and the second set being gear 12a and gear end 6b) because they are orbiting about the same axis. In order to do this, we make use of the center distance formula, $$Cd=(z1+z2)*m1,$$

where m1 is the module of the gear pair (module being the metric measure of gear pitch well known in the art).

If we do the same for the other gear pair and set the center distances of the two sets equal, $$(z1+z2)m1=(z3+z4)m2,$$

(where m2 is the module of the gear pair 12a and 6b), we have a relationship to draw valid teeth values and module values from.

If we hold m1 fixed arbitrarily, and we choose 2 whole number values for z1 and z2, we can derive values for the other variables.

For example, in the first embodiment, z1=27, z2=19, z3=18, and z4=26. If we set m1=1, then m2 must be approximately 1.045455 for the center distances of the gear pairs to match. Using our ratio formula, we find that the ratio is 61.75:1 (i.e., shaft 6 turns at 1/61.75 the speed of electric motor 4).

High Ratio Embodiments

A higher ratio embodiment could use, for example, z1=27, z2=26, z3=25, and z4=26. We find that the ratio is 676:1 for this combination, using m1=1 and m2=1.039216. This high ratio is achieved because the gear pairs are largely cancelling each other out, resulting in a ratio from the fixed gear to the output of very nearly equal to 1. Here we can see that z1/z2=1.03846 and z3/z4=0.961538 . . . i.e., the ratio of the first gear pair is slightly greater than 1, and the ratio of the second gear pair is slightly less than 1, for an overall net ratio (from multiplying the two together) that is nearer to 1 than either alone: 0.998521. When the orbiting caused by arm 16 is accounted for using the method above, we find that the output is spinning in the opposite direction of the input at a slightly slower speed, with the net result at the output being that it is turning in the same direction as the input (but a lot more slowly).

If we want to constrain m1 and m2 to the same module, we lose the large range of ratios we can get by varying the modules relative to one another (but see the section 'Creating Low-Cost Embodiments . . . ' for an alternative for when a good mesh isn't necessary). Looking again at the center distance formula we derived, $$(z1+z2)m1=(z3+z4)m2,$$

we can see that when m1=m2, (z1+z2) must equal (z3+z4); that is, the sum of the teeth of the first gear pair must equal the sum of the teeth of the second gear pair. Again, to maximize the ratio, we would like one gear pair to be slightly less than 1 and the other to be slightly greater than 1, so that when we multiply them together the result is nearly 1. For example, if z1=28, z2=26, z3=25, and z4=29, the ratio is 13.963:1.

Using Single Piece Gear Pairs to Transmit Large Torques

Turning again to FIG. 4, other aspects of the first embodiment are important to note. The fact that gears 12a and 14a comprise a single piece of material means that large torques can be transmitted between them without the chance of failure that a coupling or fastener introduces.

Using Needle Bearings with PTFE Washers to Reduce Costs

Also advantageously, this single piece of material uses a single needle bearing 32a. This is possible because since the pitch diameters of 12a and 14a are very nearly the same, and thus the loads each takes are nearly the same as well, meaning there isn't any large moments that would require a separate bearing on each side of the single gear piece. Needle bearing 32a can't take a thrust load. PTFE washers 36a and 36b carry the thrust load instead, since gears 12a and 14a are spur gears that don't produce significant thrust loads. The combination of PTFE washers and a needle bearing costs significantly less than two other bearings, such as ball bearings. Shaft 34a is cut down on each end, such that no fastener is required to keep it constrained between drive rings 18a and 18b.

Using Knurled Shafts and Tubes to Reduce Loosening and Costs

Motor mount plate 42 has a tubular support 46 that is concentric to shaft 6 and is straight-knurled on the outside. Fixed gear 40 is press-fit onto tubular support 46, and the knurl helps carry the large torque on gear 40 to the case. Using another method of fastening, such as pinning or screws, could make gear 40 prone to coming loose under many reverse cycles. Such methods are also typically more costly and require extra parts. Arm 16 is press-fit onto the straight-knurled shaft of motor 4. Again, more expensive fastening techniques are avoided by doing this.

The Hole in Shaft 6 to Allow the Shaft of Motor 4 to Clear the Assembly, and Using Dual Purpose Case Holes Shaft 6 has a drilled hole in its end that doubles as a support during machining as well as a hole to allow the shaft of motor 4 to clear the assembly. The 6 holes around the case that can be used to mount the motor, as exemplified by threaded holes 48a and 48b, allow the case to be screwed to the structure it is intended to be used with. These holes also double as the holes to screw transmission case 2 to motor mounting plate 2; therefore only one machining operation is required to fulfill both needs.

Figure 5:
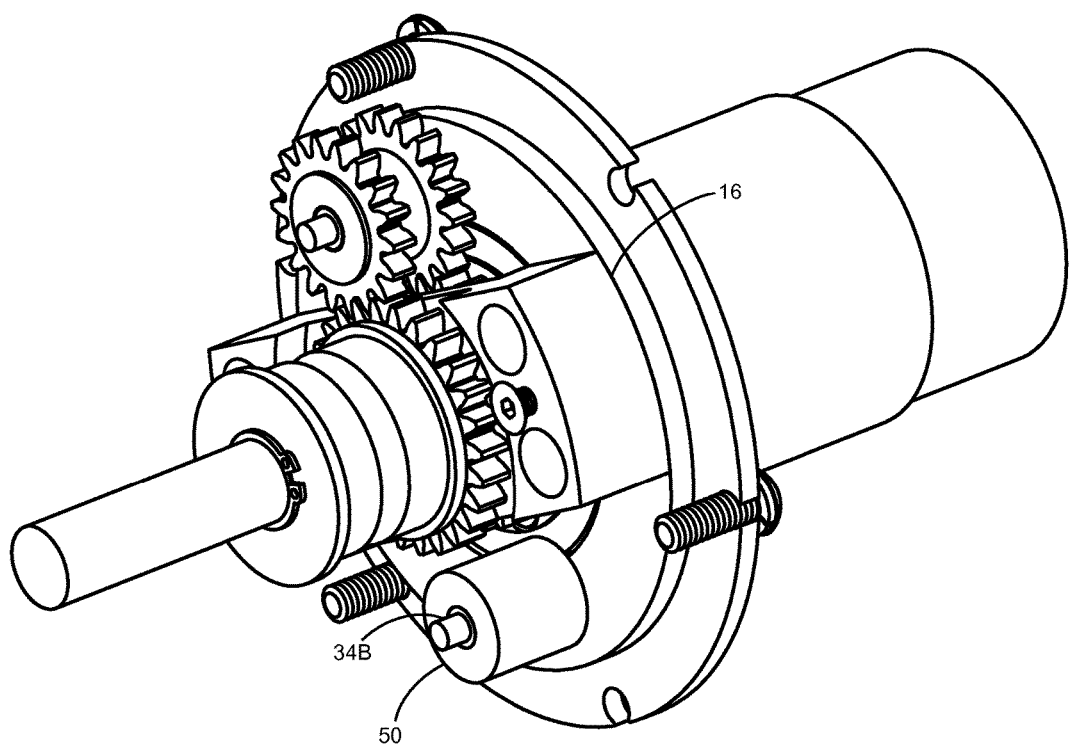
FIG. 5 is a perspective view of a second embodiment.

A Second Embodiment that Replaces a Gear Assembly with a Counterweight to Reduce Costs In a second embodiment, shown in FIG. 5, the second (lower) single piece unit comprising gears 12b and 14b has been removed, replaced simply by counterweight 50. Counterweight 50 acts to balance arm 16 when it rotates at high speeds. In the first embodiment, the rotating parts were substantially balanced around the axis of shaft 6 due to symmetry. In this embodiment, fewer parts are needed, although strength is reduced.

In typical use, power is applied to electric motor 4, which causes shaft 6 to turn. Reversing the current to electric motor reverses the direction of shaft 6.

A Third Embodiment Using Separate Components for Gear End 6b and Shaft 6

Figure 6:
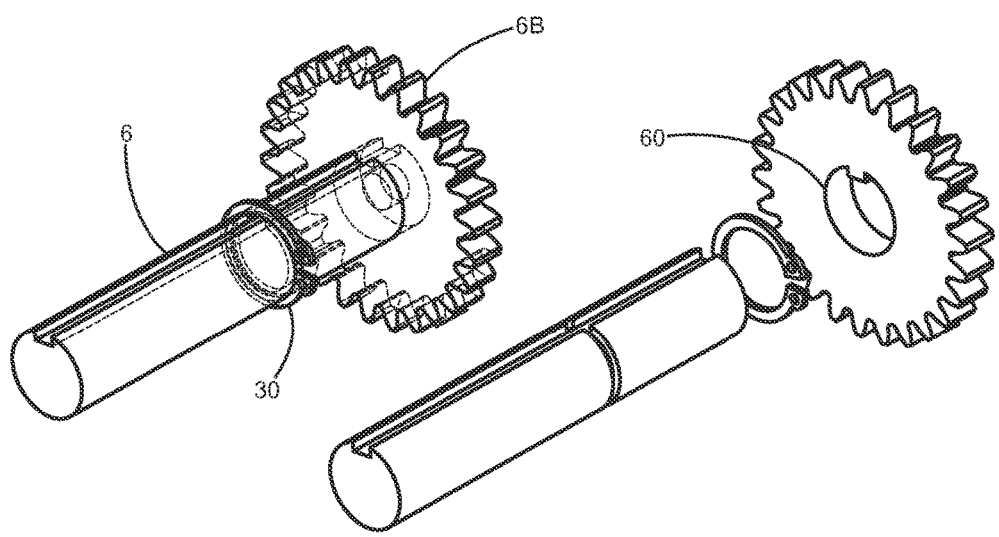
FIG. 6 is a perspective view of components from a third embodiment.
Figure 7:
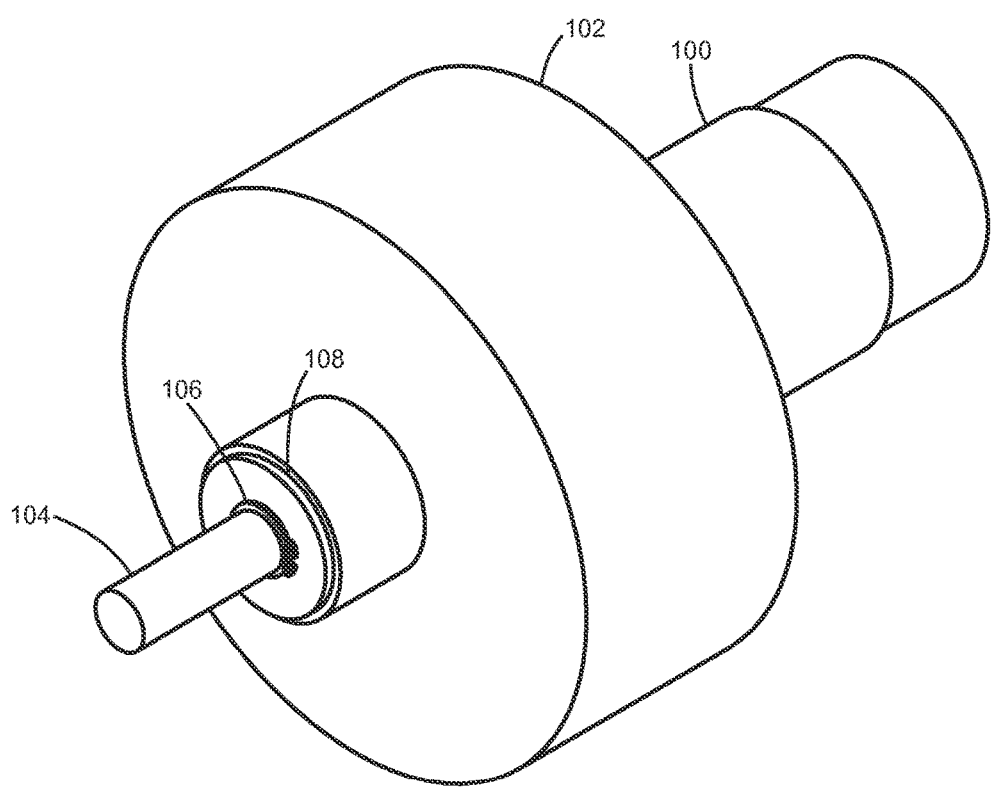
FIG. 7 is a perspective view of a fourth embodiment.

FIG. 6 shows the changes that would be made to components of the first embodiment to create a third embodiment that allows gear end 6b to be a separate part from shaft 6. A pre-keyed shaft would be used for shaft 6, which then press-fits into a cutout 60 of gear 6b. In this embodiment, the single component comprising gears 12a and 14a, fixed gear 40, and gear 6b are made in multiple different sizes, such that the center distance between gear pairs is constant but the ratios vary by making different tooth and module selections. Thus, the other components of the transmission can remain substantially the same, allowing a wide range of ratios to be offered for sale, and therefore a wide range of SKU's or separate products, without excessive tooling cost.

A Fourth Embodiment

Figure 8:
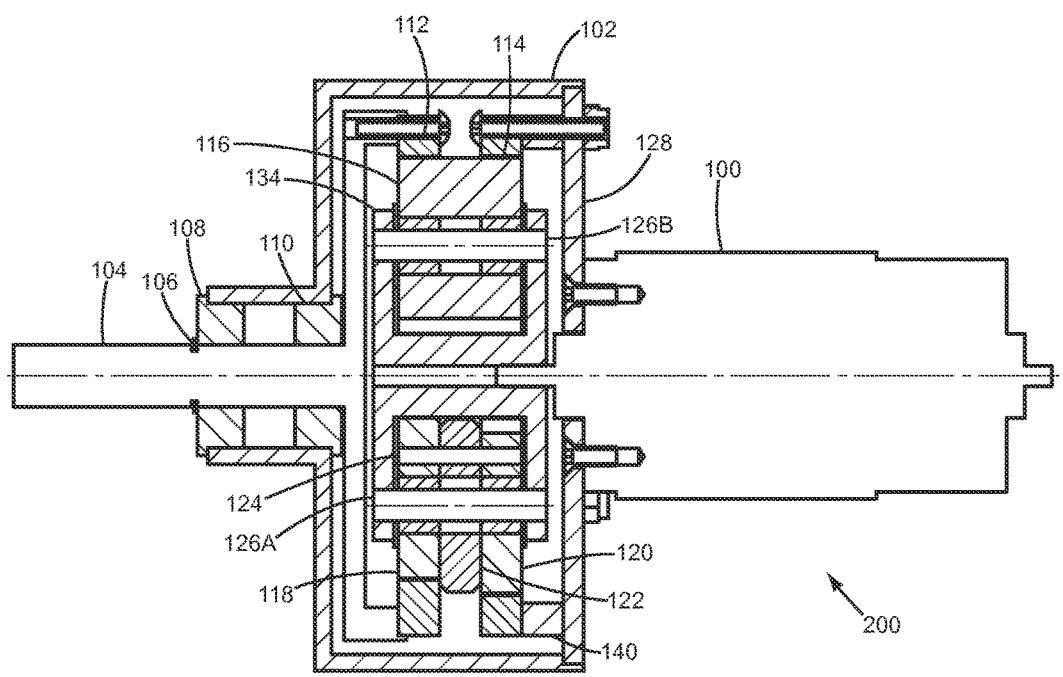
FIG. 8 is a cross-sectional view of the fourth embodiment shown in FIG. 7.
Figure 9:
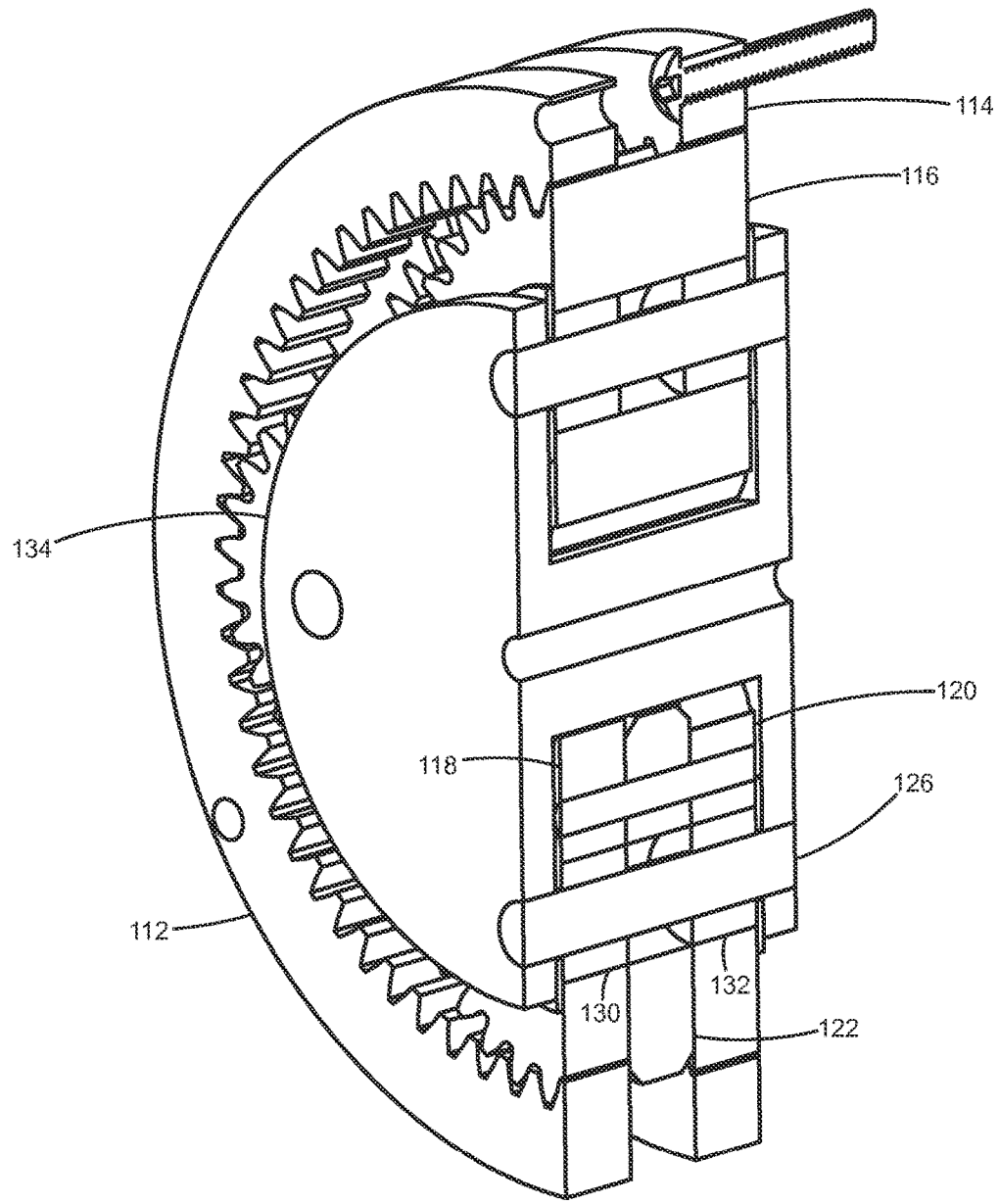
FIG. 9 is a cross-sectional perspective view of the fourth embodiment shown in FIG. 7.
Figure 10:
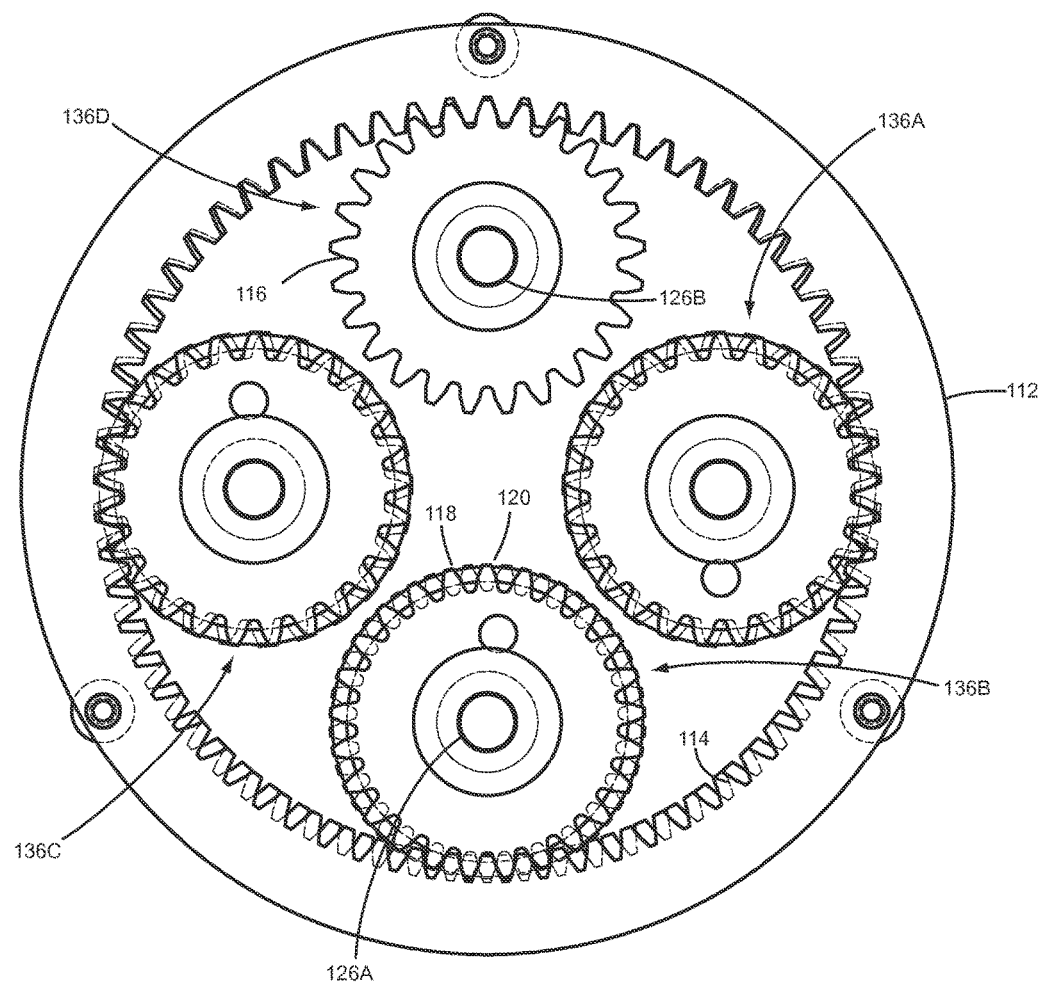
FIG. 10 is a frontal view of the fourth embodiment shown in FIG. 7.

FIGS. 7-10 show the preferred (and fourth) embodiment. An electric motor 100 drives a transmission system housed in a case 102, which has a bearing 108 that supports a shaft 104 and is retained by a retaining ring 106. FIG. 8 is a cross-sectional view of the fourth embodiment. Preferably, as shown in FIG. 10, there are 4 sets of gears spaced equally about the axis of shaft 104: a gear 116 (which comprises a gear assembly 136D by itself), and gear assemblies 136A, 136B, and 136C. Referring back to FIG. 8, the bottom half of the figure shows gear assembly 136B while the top shows gear 116. Gear assembly 136B is constructed in the same manner as 136A and 136C, except for an angular shift that will be discussed later. Thus, FIG. 8 shows all the important components of this embodiment. When electric motor 100 spins, it turns a spinning guide 134. Spinning guide 134 moves shafts 126A and 126B around the axis of shaft 104. Shaft 126A supports roller bearings 130 and 132, as shown in FIG. 9. Also as shown in FIG. 9, roller bearings 130 and 132 support gear assembly 136B. Meshing with gear 116 are internal gears 112 and 114. Internal gear 112 has 65 teeth in this embodiment, while internal gear 114 has 66 teeth.

Profile-Shifting to Enable Meshing with Good Contact

To make it possible for gear 106 to mesh with both of these gears at the same time with good contact, internal gear 114 has been profile-shifted with a shift coefficient of approximately 0.5, such that the teeth protrude more (since the pitch diameter is larger than the 65 tooth gear, they wouldn't mesh well-their axes would be too close together and a large gap would be present between the teeth). Internal gear 114 is rigidly mounted to a motor mounting plate 128 by screws and locknuts 142, which squeeze it against a spacer 140, which itself rests on motor mounting plate 128. As spinning guide 134 spins, the difference in the ratios of gear 116 to internal gears 114 and 112 cause shaft 104 to spin more slowly than electric motor 100. Using the same method as before:

$Z1$=# of teeth of internal gear 114
$Z2$=# of teeth of gear 120
$Z3$=# of teeth of gear 118
$Z4$=# of teeth of internal gear 112
$Z1$=66
$Z2$=25
$Z3$=25
$Z4$=65

As before, $Z1$ is the fixed gear, $z2$ is the gear that mates to it, $z3$ is the gear rigidly attached to $z2$, and $z4$ is the output gear. Therefore, the ratio is 65:1.

Advantageous Contact Ratios and Spacing for Multiple Gear Assemblies

Advantageously, the contact ratio of gear 116 meshing with either internal gears 114 or 112 is between 1 and 2, more specifically around 1.9, so that we can expect 2 gear teeth in mesh all the time, whereas with one of the previous embodiments, the mating of two external gears produces a lower contact ratio, and therefore less contact between the teeth for lower strength. Also, a larger number of gear assemblies in mesh means that more teeth are in contact at a time, resulting in more torque-transferring capability for a given size than the aforementioned embodiments. The fourth embodiment uses four sets of gear assemblies, although a version with only gear 116 and a counterbalance (as shown in FIG. 5) can be constructed, or a version with only 2 gear assemblies such as gear 116 and gear assembly 136B of FIG. 10 could also be constructed. Similarly, three gear assemblies, or more than four gear assemblies, are also possible; in these cases, as in FIG. 10, the gear assemblies would be spaced around the device in equal angular increments to maximize the size of the gears, for maximum strength.

The Single Piece Gear is Balanced Relative to the Other Gear Assemblies

It is important to examine FIG. 10 carefully. Gear 116 is a single piece. Gear 116 is made as a single piece to lower manufacturing costs, but it requires that the assemblies made up of different gears be balanced relative to it (alternatively, 4 matching gear assemblies with 2 gears each could be used instead).

Incorporating Angular Shifts to Allow Multiple Gear Assemblies to Mate Simultaneously Gear 116, being a single piece, obviously has no angular shift between its front and rear. Meanwhile, gear assembly 136A has a 3.6 degree shift between its front and rear gears. Similarly, gear assembly 136B has a 7.2 degrees shift between its front and rear gears, while gear assembly 126C has a 10.8 degree shift between its front and rear gears. These shifts are required to allow the gear assemblies to mate with internal gears 114 and 112 simultaneously, since each has a different number of teeth. This number is derived by taking the number of teeth used in the gear assembly (i.e., 25) and dividing it into 360: 360/25=14.4 degrees as the angle between teeth. Therefore, since in FIG. 10 the front and rear internal gears have a difference of one tooth, we can expect that we need to shift the gear pairs that make up gear assemblies 136A, 136B, and 136C accordingly to allow proper meshing. Thus the first gear has no shift, the second has ¼ of a tooth shift, the 3rd has ½ of a tooth shift, and the 4th has ¾ of a tooth shift. A dowel pin 124 maintains the angular relationship between the gears, as it is press-fit into those gear assemblies with multiple gears (as shown in FIG. 8).

Achieving Very High Ratios

In the aforementioned embodiments, it is important to recognize that very high ratios can be achieved when the ratio between z1 and z2 largely cancels out the ratio between z3 and z4. For example, achieving a high ratio is feasible when:

$$z1-z2>0 \text{ and}$$

$$z3-z4<0$$

But, it is not feasible when:

$$z1-z2<0 \text{ and}$$

$$z3-z4<0$$

In other words, the difference between gear pairs must have the opposite sign to cancel each other out for the maximum ratio.

The best ratios are typically achieved when the sums:

$$Z1+Z2$$

and $$Z3+Z4$$

are within 2 of each other, and $|z1-z2|<=2$ and $|z3-z4|<=2$ and $z1-z4<=2$ and $z3-Z2<=2$. For example, z1=25, z2=24, z3=23, z4=24.

Also note that the best ratios typically occur when the mating gears have a small difference in teeth (i.e., 1 or 2 . . . as for example z1 and z2). Also, the best ratios typically occur when the ratio between the teeth of two mating gears is very nearly, but not quite, a whole number. In the example given above, where z1=25, z2=24, z3=23, z4=24, z1/z2=1.041666667 and Z4/Z3=1.043478261. Therefore, it is readily seen that both ratios of z1/z2 and z4/z3 are close to a whole number (1) but not quite equal to it, being slightly greater than 1 by about 0.04. Furthermore, the best ratios occur typically when $|(z1/z2)-(z4/z3)|$ is a small number, typically less than 0.05.

Preferable Combinations of Gears

Table 800 of FIG. 21 demonstrates overall transmission ratios (denoted $1/(1-r)$) for preferable combinations of gears. Table 800 is arranged in two major rows of gear combinations, with each major row further broken down into rows with the variables of each combination listed on the left side of the table, corresponding to the notation used above.

While the gear pairs shown in FIG. 10 that make up each gear assembly 136A-D of the fourth embodiment use the same number of teeth, this is not a requirement. The number of teeth between the pairs can be different, as in previous embodiments.

Preventing Vibration from Unbalanced Weight Using a Spacer of a Calculated Size and Shape The spacer 122 shown in FIG. 9 between the gears serves more than just to space the gears: it has a calculated size and shape so as to give gear assemblies 136A, 136B, and 136C each the same moment of inertia about axis 104 as gear 116, so that there isn't vibration in the assembly due to unbalanced weight about axis 104.

Creating Low-Cost Embodiments at the Cost of a Good Mesh by not Varying the Module or Profile-Shifting It is important to note that varying the module in the first embodiment and profile shifting in the fourth embodiment accomplish the same purpose of maintaining the same center distance with a good mesh between pairs of gears that would normally have a different center distance. It is also possible to do neither and simply mate standard gears together in low cost applications, but this typically produces a lot of backlash between one of the gear pairs.

Alternative Gear Types and Achieving Zero Backlash

It is to be recognized that different gear types can be used in the embodiments without significantly altering them. For example, stub spur gears or helical gears can be used in place of regular spur gears.

Figure 25:
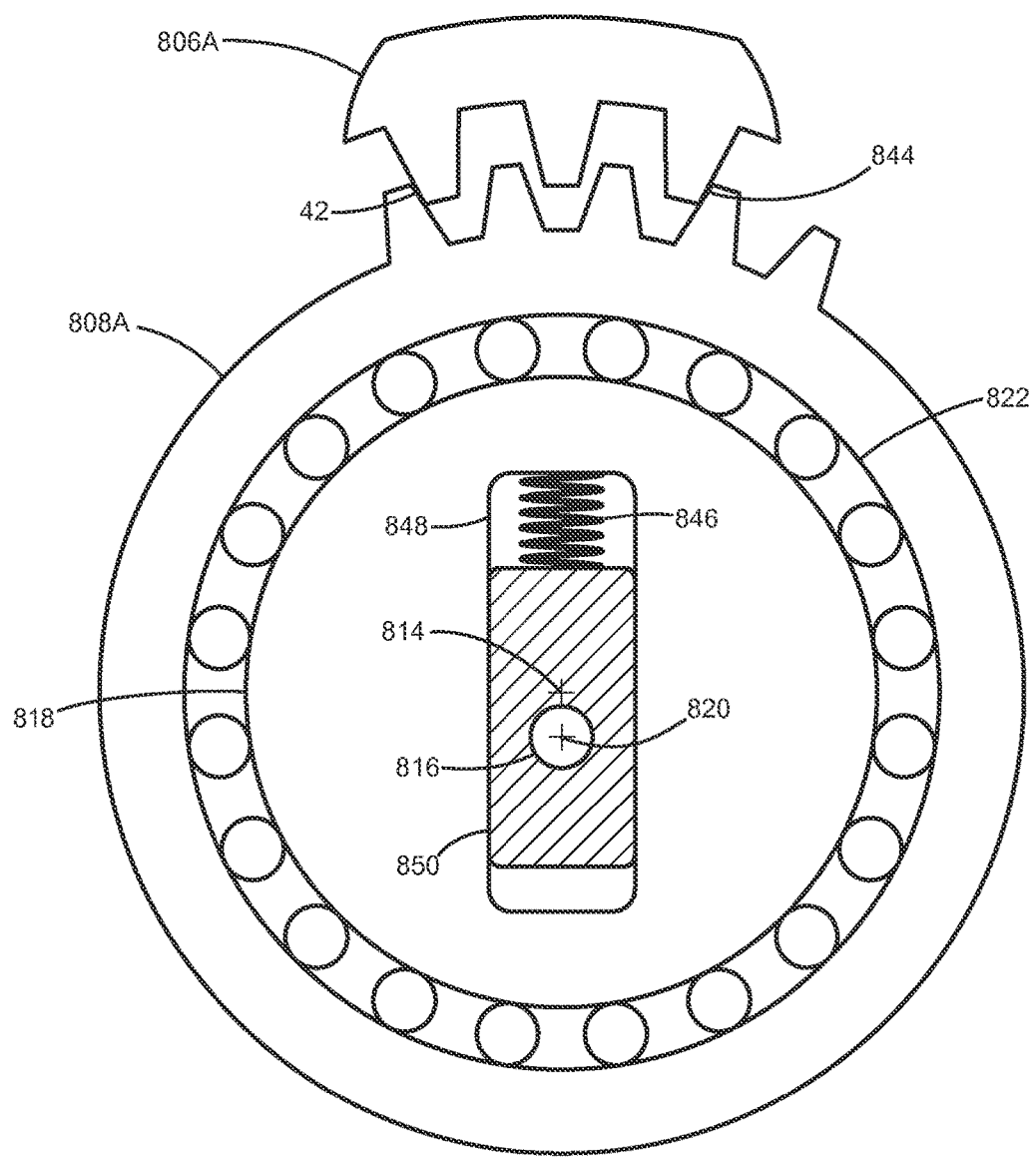
FIG. 25 shows a front view of components of the twelfth embodiment that have been modified to create a thirteenth.

Zero backlash can be achieved by pressing the gear assemblies into the internal gears, as explained later and illustrated in FIG. 25.

Calculating the Ratio

Recalling our speed ratio formula and calling it X:

$$X=(z1/z2)*(z3/z4)$$

The ratio can be calculated as:

$$R=1/(1-X)$$

A Fifth Embodiment of an Electric Screwdriver-Drill

Figure 11:
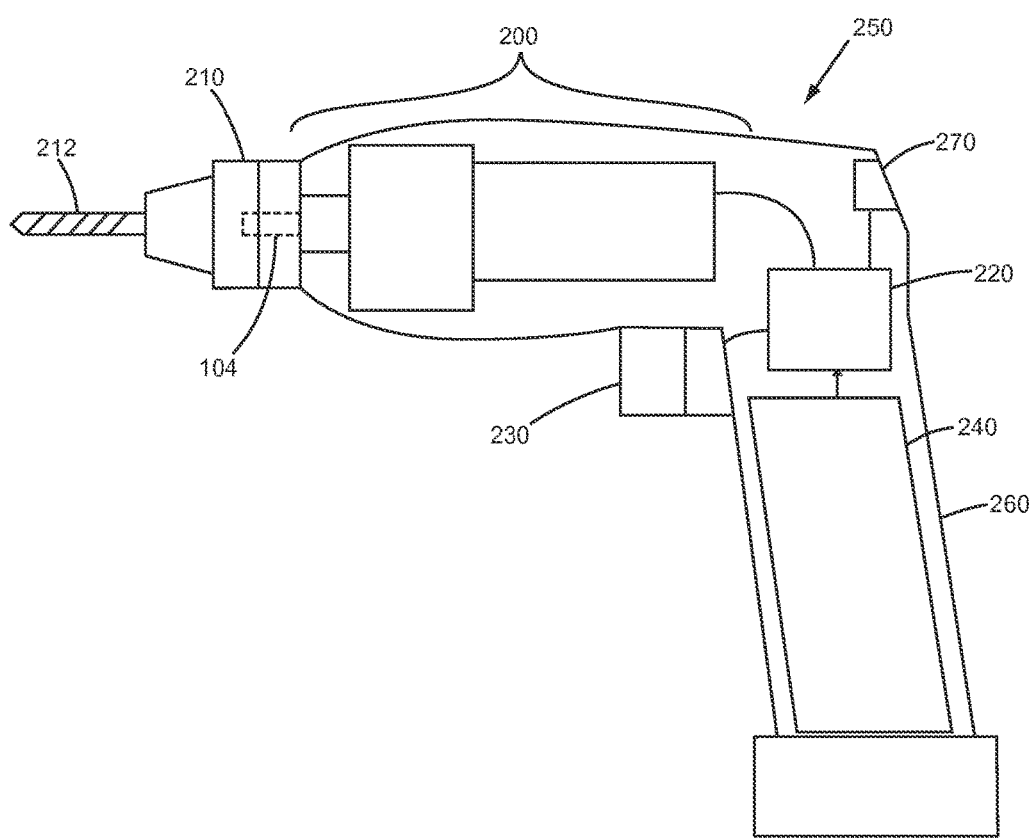
FIG. 11 is a side view of a fifth embodiment.

FIG. 11 shows a fifth embodiment. An electric screwdriver-drill 250 comprises transmission 200 from FIG. 8. Shaft 104 of transmission 200 drives a keyless chuck 210, which spins a bit 212. A control circuit 220 switches power from a battery 240 to electric motor 100 when a trigger 230 is pulled. A switch 270 tells control circuit 220 to reverse the direction of motor 100. A case 260 holds the components. Advantageously, transmission 200 makes electric screwdriver-drill 250 very compact while allowing it to have a lot of torque because of its high ratio, which is preferably 65:1, but can also be other ratios that are greater than 30:1.

A Sixth Embodiment of a Controlled Damper

Figure 12:
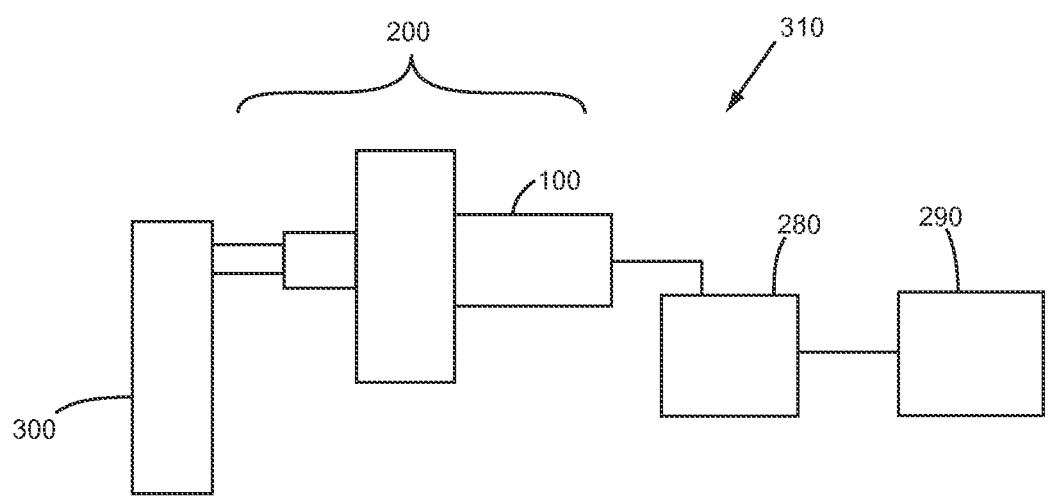
FIG. 12 is a schematic view of a sixth embodiment.

FIG. 12 shows a sixth embodiment. A controlled damper 310 comprises an output 300 and transmission 200 from FIG. 8, which is driven by electric motor 100. A control circuit 280 allows electric motor 100 to act as a generator or as a motor, and is connected to a power source 290. As output 300 is moved, transmission 200 provides electric motor 100 with a great deal of mechanical advantage over the output 300, so that a small torque from electric motor 100 can stop a great load on output 300. Electric motor 100 is preferably a switched reluctance motor with a low rotor inertia and no cogging torque. These features allow output 300 to be spun without a user feeling detents, excessive inertia and/or friction, making output 300 a strong damper with little power input, if any. When electric motor 100 is operated in generator mode, energy is transferred to power source 290.

Figure 13:
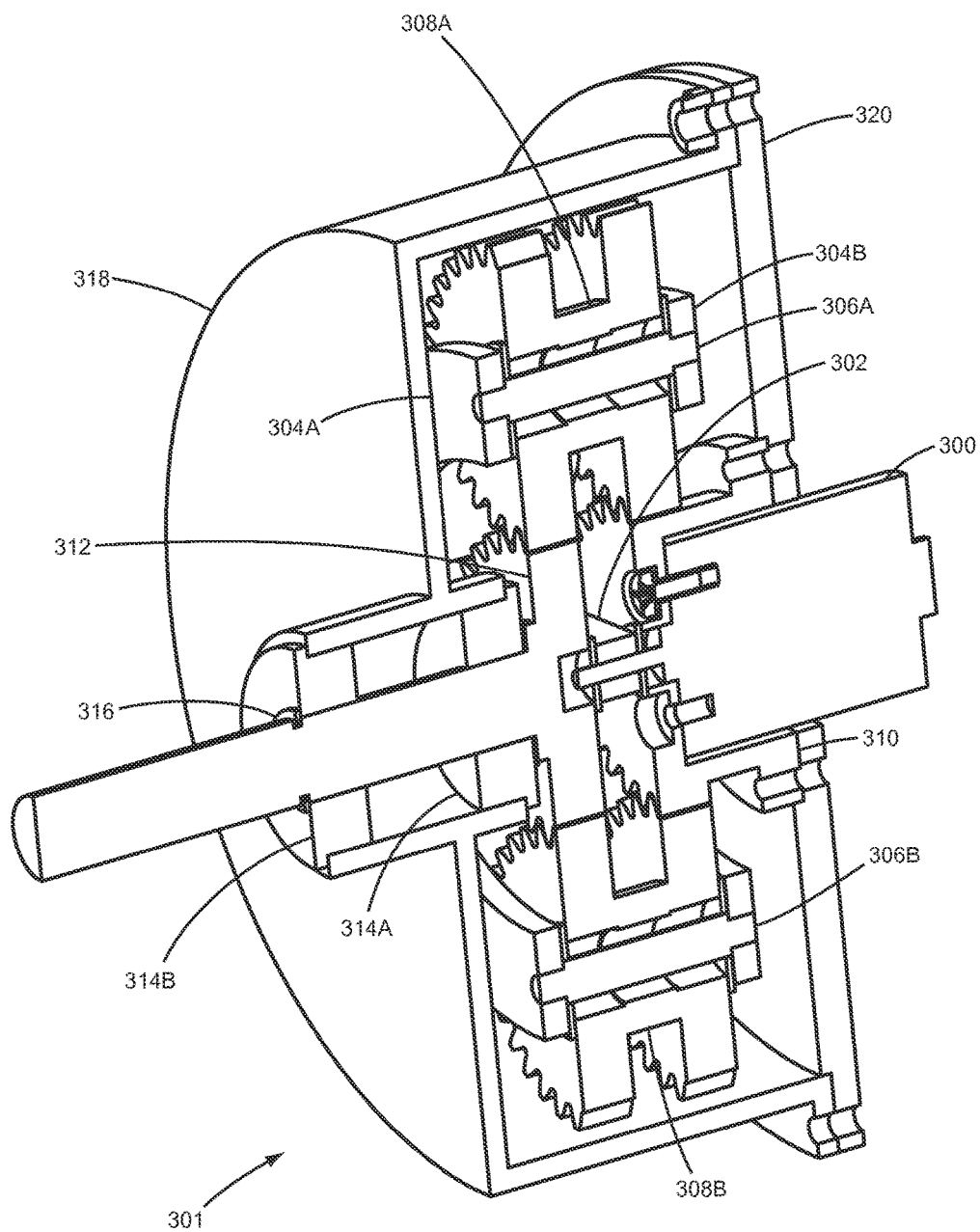
FIG. 13 is a cross-sectional perspective view of a seventh embodiment.
Figure 14:
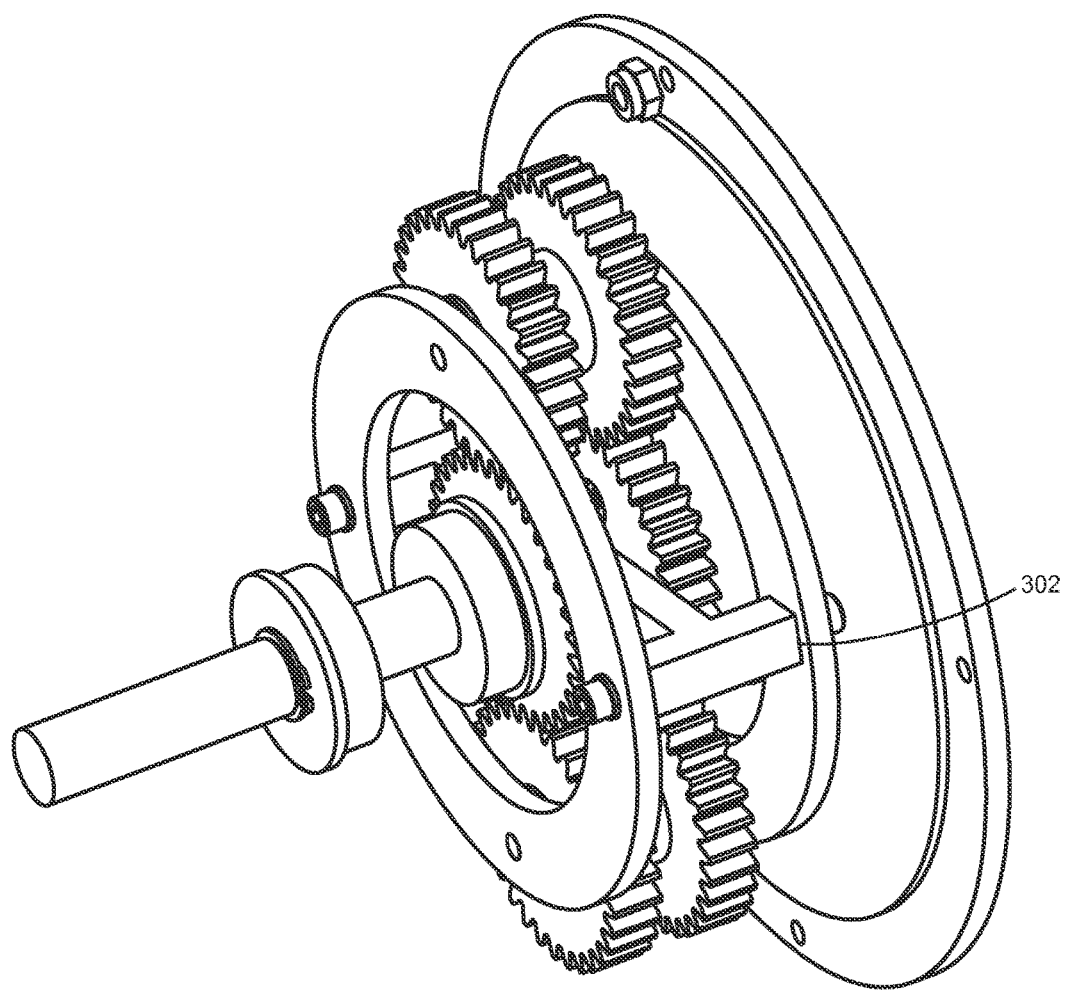
FIG. 14 is a perspective view of components of the seventh embodiment shown in FIG. 13 when component 318 is removed.

A Seventh Embodiment of a High Ratio Transmission Using an Electric Motor without Detents FIGS. 13-14 show a seventh embodiment, a high ratio transmission 301. An electric motor 300 is a slotless motor (meaning it has no slotted steel wound with coils, so it has no detents from when the magnets line up with the steel . . . it is sometimes referred to as an "ironless" or "coreless" motor). Electric motor 300 could alternatively be another motor without detents when power is not applied, such as a switched reluctance (SR) motor or a motor with a field-wound coil providing its magnetic poles (so that when the power to the poles is turned off, and the output shaft turned, there are no detents). The shaft of electric motor 300 turns a spinner or intermediate component 302 (spinner 302 is press-fit onto the shaft of electric motor 300), which has rings 304a and 304b attached to it. Rings 304a and 304b support shafts 306a and 306b, which in turn support double gears 308a and 308b via roller bearings (the roller bearings are not shown; there are two roller bearings per double gear, each inserted into one end of it in the counterbores shown in the double gears). Double gears 308a and 308b are the same, other than being rotated 180 degrees relative to each other as shown, so that they can both mesh with the same gears. The back half (toward the motor) of double gear 308a meshes with fixed gear 310, which is bolted to a backplate 320 and holds electric motor 300. The front half (toward the output shaft) of double gear 308a meshes with an output 312, which is a single piece consisting of a gear at one end and the output shaft at the other. Output 312 is free to rotate via ball bearings 314A and 314B, which are in turn supported by a case 318. Case 318 bolts to backplate 320 to enclose the transmission. FIG. 14 is a 3D view of the assembly with a better view of spinner 302, as case 318 has been hidden.

The same notation will be used with the seventh embodiment as in past embodiments:

Z1=# of teeth of fixed gear 310
Z2=# of teeth of the back of double gear 308a
Z3=# of teeth of the front of double gear 308a
Z4=# of teeth of on output 312
Z1=33
Z2=32
Z3=31
Z4=32
M1 (the module of z1 and z2) is 1.
M2 (the module of z3 and z4) is 1.0317.

As the shaft of motor 300 spins, spinner 302 spins. It drives shafts 306a and 306b, which cause double gears 308a and 308b to orbit about the axis of electric motor 300 (which is coaxial to the shaft of output 312). As double gears 308a and 308b orbit, the fact that they are meshed with fixed gear 310 causes them to rotate as they orbit. Their rotation is slightly higher than the orbiting speed due to the ratio of z1/z2. Since double gear 308a maintains a constant rotational speed across its front and rear gear sections, the leftover speed rotates the output 312 using the ratio z3/z4. z1/z2 is slightly greater than 1 at 1.03125 and z3/z4 is slightly less than 1 at 0.96875. When they are multiplied together, the net effect is a ratio of 0.9990234375, very close to 1. Using our ratio equation, R=1/(1−X), R=1024, so that 1024 revolutions of the shaft of electric motor 300 produces 1 revolution of output 312.

An Eighth Embodiment for Reducing the Manufacturing Costs of Making Different Versions of a High Ratio Transmission An eighth embodiment is based on the seventh embodiment shown in FIG. 13. In this embodiment, double gears 308a and 308b, fixed gear 310, and output 312 can be changed to produce many versions of the transmission. The same notation used above for FIG. 13 is used, but the teeth of each part are varied. FIG. 15 shows five versions of the eighth embodiment with different combinations of z1, z2, z3, and z4 (representing the teeth on the aforementioned gears). In version 400, z1 is 25, z2 is 24, z3 is 23, and z4 is 24. The center distance between the axes of both gears is shown beside "cd". The modules of the gear pairs is likewise shown beside m1 (for z1 and z2) and m2 (for z3 and z4). The overall ratio of the first version is the bottom number in the first box, 576 (to 1). The same notation is used in each other box 402, 404, 406, and 408. Note that in each version, the center distance (cd) is held to 24.5 mm. This means that the other components of the assembly (those without gear teeth) can remain the substantially the same, since the center distance between double gear 308a and the axis of output 312 remains the same. This reduces the manufacturing costs of making the high ratio transmission in different versions, since only four parts need to be changed, at most, to be able to sell different transmission versions with ratios of 576:1, 191.6:1, 81:1, 25:1, and 12:1.

A Method of Selling Transmissions Based on the Eighth Embodiment

A method of selling based on the eighth embodiment is as follows:

1) a user visits the company web page and selects a transmission version by using pull-down menus, choosing the desired ratio.
2) The user checks out and pays for the transmission
3) The company receives the order over the Internet and sends an order identifier along with the selected ratio to manufacturing
4) Manufacturing looks in a database of that particular version of the transmission and identifies the necessary number of teeth of each toothed component to make the transmission with that ratio
5) Automated manufacturing equipment loads the tooth data and produces the 4 toothed components.
6) The rest of the transmission parts are pulled from stock and the toothed components are installed to produce the transmission the customer ordered
7) The transmission is shipped to the address for the order identifier Preferable Teeth Combinations and Relationships Returning to the seventh embodiment shown in FIG. 13, it is desirable to choose teeth such that z1 and z2 are close in number to each other, and that z3 and z4 are close in number to each other. |z1−z2| is preferably 2, even more preferably 1. Similarly, |z3−z4| is preferably 2, even more preferably 1. Furthermore, it is preferable that either z1 or z2 matches z3 or z4, or at least within 1 or 2 if this is not possible. For example, as shown in box 502 of FIG. 16, z1=7, z2=6, z3=5, and z4=6. Here, z2 and z4 are the same. In Box 504, z1 and z3 are the same.

Furthermore, it is preferable that if z1−z2 is positive, then z3−z4 be negative, or if z1−z2 is negative then z3−z4 be positive. This is shown in FIG. 16, where boxes 502, 504, 506, and 508 each show one of the 4 combinations to produce this effect for the teeth numbers shown. This is because we want the ratio of z1/z2 to mostly cancel the ratio of z3/z4 when the ratios are multiplied together. We don't want them to completely cancel because then the output speed would be 0, so we don't want z1/z2 to equal z3/z4.

Furthermore, we want the modules to be such that (z1+z2)m1=(z3+z4)m2.

A Preferred Arrangement of the Four Gears Achieving the Highest Ratio

Furthermore, as shown in FIG. 16 by the boldface integers to the right and below of 'r' in each box representing the ratio, the way that the gears are arranged has a small effect on the ratio. For example, the ratio using the teeth arranged as shown in box 502 and 508 is 36 while the ratio using the teeth arranged as shown in box 504 and 506 is 35. Of the four combinations, the one shown in box 502 is preferred, wherein z1−z2 is positive and z3−z4 is negative, because the highest ratio is achieved and because the gear represented by z3 that mates to the output (represented by z4) has slightly less torque on it than the output does, so that the other components behind it see this slightly lower torque and therefore have less of a chance of breaking due to high torque.

Embodiments Using the Minimum Number of Teeth to Achieve Particular Ratios

FIG. 17 shows a range of transmission ratios that can be produced using the minimum number of teeth possible. For example, in box 602, z1=7 teeth, z2=6, z3=5, and z4=6, which achieves a 36:1 ratio. It is desirable to use a small number of teeth so that each tooth can be bigger, for greater strength, as well as for compact construction. Of note is the fact that the ratio is the square of z2 (or z4) in each case.

A Ninth Embodiment Incorporating Belts and Pulleys

Figure 18:
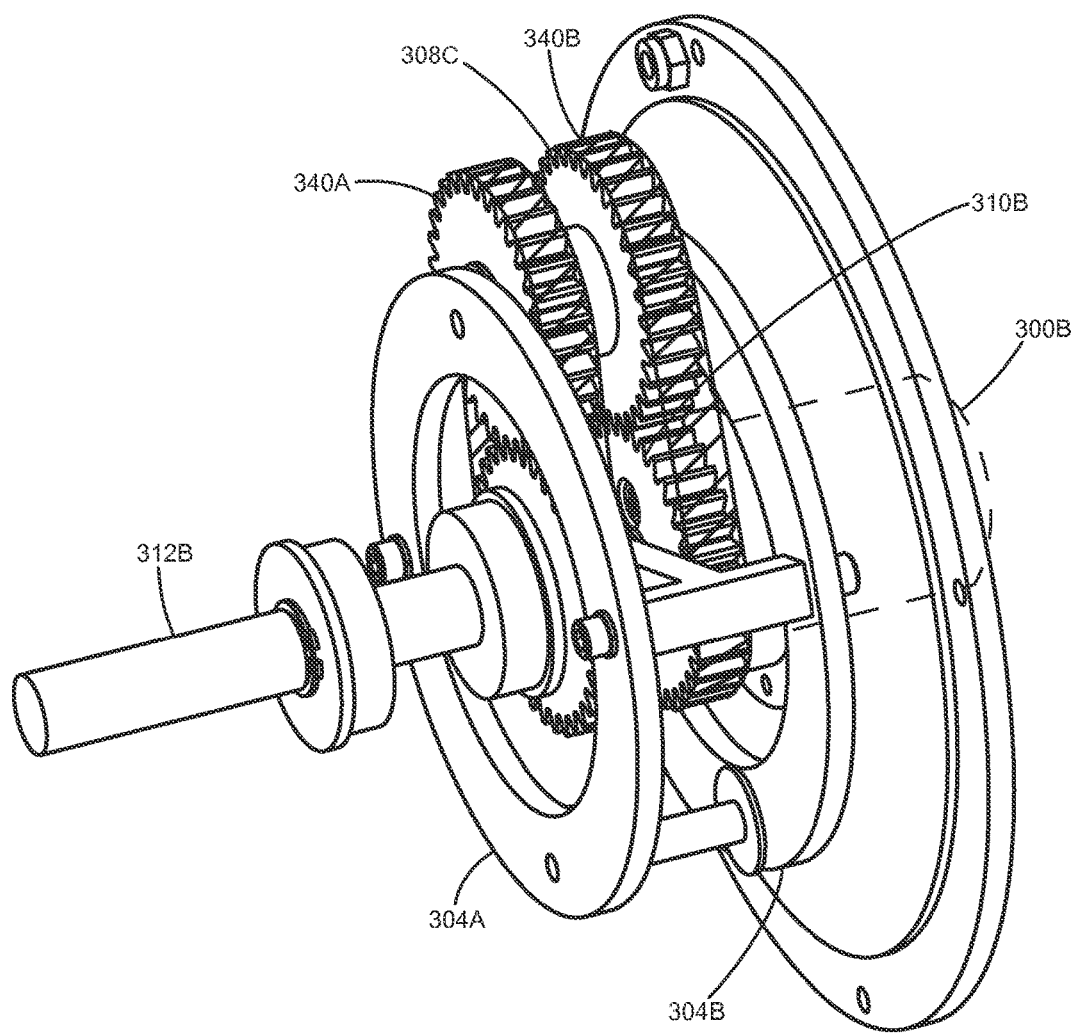
FIG. 18 shows a perspective view of a ninth embodiment.

A ninth embodiment is shown in FIG. 18. It is the same as the embodiment shown in FIG. 13 except that double gear 308a has been replaced with double timing pulley 308c, fixed gear 310 has been replaced with fixed pulley 310b, output 312 has been replaced with pulley output 312b, timing belts 340a and 340b have been added, double gear 308b has been removed, and electric motor 300 is replaced with optical encoder 300b. FIG. 18 shows the grooves of the timing pulleys meshing, but this does not actually happen (pulley pairs don't touch at all), the drawing from FIG. 14 was just recycled in creating this drawing.

Advantageously, in the ninth embodiment, the zero (or near zero) backlash characteristics of certain timing belts is exploited. Timing belts 340a and 340b are preferably 2 mm Powergrip GT belts from The Gates Rubber Company of Denver, Colo., while the pulleys are made with profiles to mate to those belts (i.e., fixed pulley 310b is machined from 2 mm Powergrip GT pulley stock). Timing belts 340a and 340b could alternatively be 32 DP "No-Slip" belts from Pic Design of Middlebury, Conn. In the ninth embodiment, the teeth counts z1–z4 become instead the groove counts for the pulleys; m1 and m2 become the belt's teeth pitch.

A Tenth Embodiment

Figure 19:
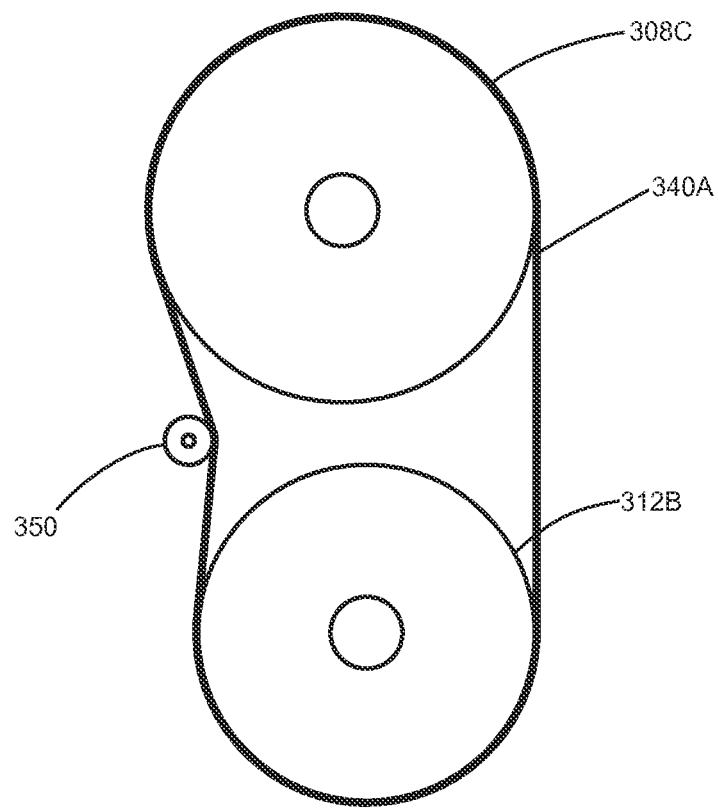
FIG. 19 shows a modification that can be applied to the ninth embodiment shown in FIG. 18 to create a tenth embodiment.

Alternatively, in a tenth embodiment, the same belt pitch for both timing belts 340a and 340b can be used, but a tensioner is added, as shown in FIG. 19, to take up extra belt length.

Additional Details of the Ninth Embodiment

In the ninth embodiment shown in FIG. 18, a small rotation of output 312b causes a large rotation at the shaft of optical encoder 300b (which is mounted the same way as electric motor 300 was). Advantageously then, since optical encoders are typically limited to a certain number of counts per revolution, such as 2048, the overall ratio of the transmission amplifies the effective sensitivity of the encoder when output 312b is turned. For example, if the overall ratio of the transmission is 36:1, the shaft of optical encoder 300b would turn 36 times for each revolution of output 312b. Thus, if optical encoder 300b has a resolution of 2048 counts/rev, it effectively has a resolution of 36×2048 or 73728 counts/rev in relation to output 312b. If the transmission and encoder replaced just an encoder in a device requiring high resolution, the performance of the device may be enhanced.

An Eleventh Embodiment

Figure 20:
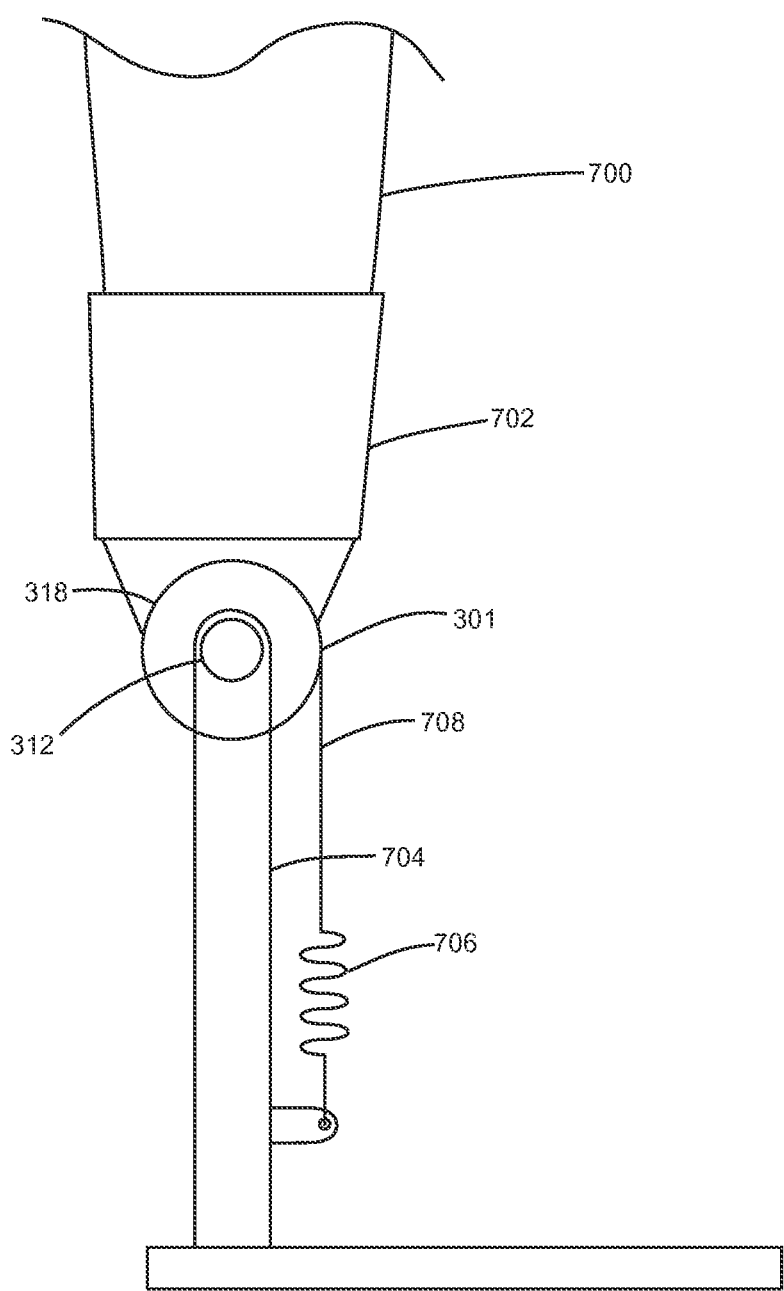
FIG. 20 shows a side view of an eleventh embodiment.

FIG. 20 shows an eleventh embodiment. A high ratio transmission 301 forms a prosthetic knee joint for an amputee 700 (his leg is shown only). His thigh is attached to socket 702, which is attached to a case 318 of a transmission 301. An output 312 of transmission 301 is attached to a lower prosthetic leg 704, which is attached to a prosthetic foot 706. Advantageously, the large ratio of high ratio transmission 301 gives electric motor 300 a large mechanical advantage over the motion of lower prosthetic leg 704. Electric motor 300 is a slotless motor as described previously, using very low rolling friction bearings, preferably needle bearings. This creates a low, detent free resistance when lower prosthetic leg 704 is swung freely by amputee 700. When it is desired that lower prosthetic leg 704 swing freely, the terminals of electric motor 300 are isolated from each other. When it is desired that lower prosthetic leg 704 have a small amount of braking torque, the terminals of electric motor 300 are pulsed between isolated and connected to a battery, such that electric motor 300 acts as a generator that stores energy in the battery. The pulsing method is a pulse width modulation (PWM)-style method, such that the average "on" or "connected" time is increased as more braking is required and decreased when less braking is desired. When it is desired that lower prosthetic leg exert a very high torque, power is sent to electric motor 300 to turn it in the opposite direction of the motion, creating a torque to oppose motion. Furthermore, at certain times during amputee 700's walking, it may be desirable to swing lower prosthetic leg 704. In these cases, electric motor 300 is energized to drive the lower leg in the desired direction. A counterbalancing spring 706 is attached via a cable 708 to wrap around case 318 (or, alternatively, a cam-shaped surface to vary the mechanical advantage). The other end of counterbalancing spring 706 is attached via a cable to lower prosthetic leg 704, such that when the lower prosthetic leg 704 is rotated backwards (to the left in the drawing), spring 706 is stretched, carrying some of the load when amputee 700 bends his knee. Advantageously, in this embodiment, a prosthetic knee is constructed that uses less power than a conventional prosthetic knee.

Alternatively, electric motor 300 can be of the type that doesn't use conventional bearings, such as one using magnetic bearings or one using its main coils to create magnetic bearings. Doing this would lower the resistance amputee 700 feels when swinging lower prosthetic leg 704 freely. Also alternatively, power could be provided to electric motor 300 when lower prosthetic leg 704 is swung so as to turn lower prosthetic leg in the direction of motion with enough torque to cancel out the resistance due to friction. Both of these two alternatives to decrease torque and improve the dynamic range of transmission 301 could be applied to the sixth embodiment shown in FIG. 12 as well.

A Twelfth Embodiment

Figure 22:
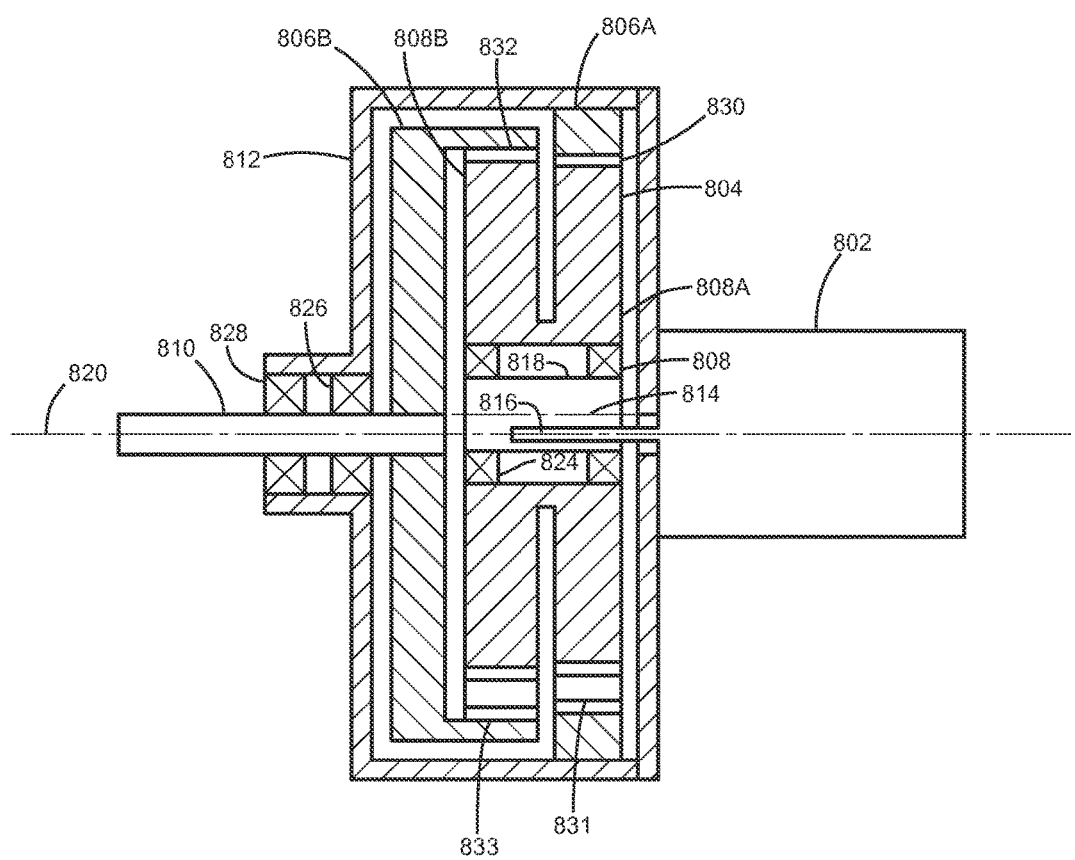
FIG. 22 shows a cross-sectional view of a twelfth embodiment.

A twelfth embodiment is shown in FIG. 22. The case of an electric motor 802 is fixed to a backplate 804. A shaft 816 of electric motor 802 rotates about axis 820. Shaft 816 is press-fit into a cylinder 818, which is a cylinder about an axis 814 (therefore, electric motor 802 causes cylinder 818 to rotate eccentrically about axis 820, because axis 820 and axis 814 do not coincide). Ball bearings 822 and 824 fit around cylinder 818 and support a gearset 808, which is comprised of a small pinion 808a and a large pinion 808b. Pinion 808a has gear teeth 830 and pinion 808b has gear teeth 832. Pinions 808a and 808b are concentric to each other, and because they make up a single part, gearset 808, they are fixed together and rotate at the same rate at all times. An internal gear 806a is fixed to a housing 812, which is fixed to a backplate 804. Gear teeth 831 of internal gear 806*a* mesh with the gear teeth 830 of small pinion 808*a*. The output external gear 806*b* has gear teeth 833 that mesh with gear teeth 832 of large pinion 808*b*. Output external gear 806*b* has a shaft 810 press-fit into it. Shaft 810 is rotably supported by ball bearings 826 and 828, which are attached to housing 812. Therefore, output external gear 806*b* and shaft 810 move together and rotate about axis 820. Small pinion 808*a* has a slightly smaller pitch diameter at gear teeth 830 than does large pinion 808*b* at gear teeth 832. To mate with these pinions, gear teeth 831 of internal gear 806*a* has a slightly smaller pitch diameter than do gear teeth 833 of output external gear 806*b*.

Figure 23:
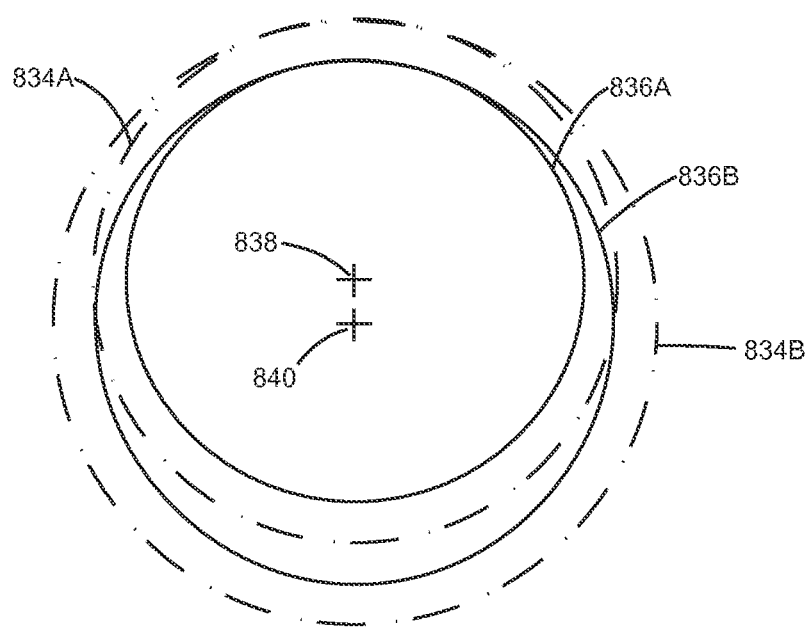
FIG. 23 shows a schematic view of the eccentric motion inside the twelfth embodiment shown in FIG. 22.

The pitch diameters of the twelfth embodiment are illustrated in FIG. 23. Pitch diameter 836*a* belongs to small pinion 808*a*, which is tangent to pitch diameter 836*b* belonging to external gear 806*a* where the two gears mesh. Similarly, pitch diameter 834*a* belongs to large pinion 808*b*, which is tangent to pitch diameter 834*b* belonging to output external gear 806*b* where the two gears mesh. Pitch diameter 834*a* and pitch diameter 836*a* share a center 838, which is pierced by axis 814 of FIG. 22. Pitch diameter 834*b* and pitch diameter 836*b* share a center 840, which is pierced by axis 820 of FIG. 22. When electric motor 802 is energized and shaft 816 spins, it turns cylinder 818 eccentrically, and cylinder 818 causes gearset 808 to move eccentrically as well. As gearset 808 moves eccentrically, the meshing of small pinion 808*a* and internal gear 806*a* causes small pinion 808*a* to rotate, since internal gear 806*a* is fixed. Since small pinion 808*a* and large pinion 808*b* are of the same part, gearset 808, and move together, large pinion 808*b* rotates at the same rate as small pinion 808*a*. Large pinion 808*b* causes output external gear 806*b* to rotate, due to their meshing, which causes shaft 810 to rotate about axis 820. The difference in pitch diameters of small pinion 808*a* and large pinion 808*b* sets the ratio and speed of shaft 810 relative to shaft 816, as the smaller the difference between the pitch diameters of small pinion 808*a* and large pinion 808*b*, the larger the reduction ratio and the slower shaft 810 turns relative to shaft 816. The meshing of small pinion 808*a* and internal gear 806*a* is exemplified by FIG. 24. When the difference in the pitch diameters of the two gears is small, it internal gear 806*a* requires a profile shift. For example, when the gears have a module of 1 and the internal gear has 50 teeth and the pinion has 49 teeth, an addendum modification coefficient of −1 on the internal gear allows the gears to mesh without getting stuck during rotation.

A Thirteenth Embodiment

Figure 24:
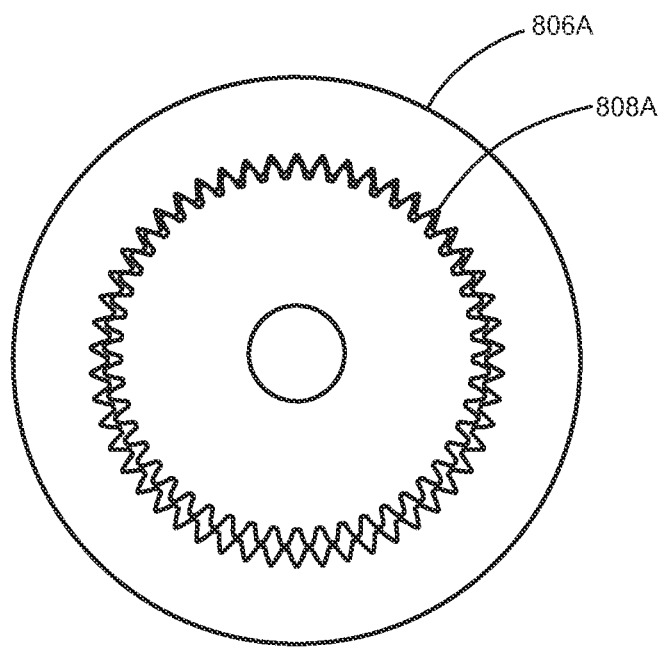
FIG. 24 shows a front view of components 806a and 808a of the twelfth embodiment shown in FIG. 22.

A thirteenth embodiment, a modification of the twelfth embodiment shown in FIGS. 22-24, uses a spring loaded version of cylinder 818 to press the mating gears together to remove backlash. As can be seen in FIG. 25, shaft 816 is press-fit into a rectangular slide 850, which slides in a slot 488 cut into cylinder 818. A spring 846 is introduced, forcing cylinder 818 to push the teeth of small pinion 808*a* into the teeth of internal gear 806*a*. As can be seen, the teeth are forced together on the left side of the teeth of internal gear 806*a* on the left of FIG. 25 at contact point 842 and on the right side of the teeth of internal gear 806*a* on the right of FIG. 25 at contact point 844, removing any backlash between internal gear 806*a* and small pinion 808*a*. As the teeth of both gears wear, spring 846 compensates by expanding, driving the worn teeth into contact anyway. Since the spring action is largely perpendicular to the load along the gear teeth (which is roughly tangent to the pitch diameter), advantageously there is less of a tendency for the load to drive the spring into compression (undesirable for heavy loads because the spring would be excessively large). This anti-backlash embodiment, though more complicated than the previous embodiment, would be desirable in applications such as robotics and motion control, where backlash is highly undesirable.

While certain exemplary embodiments have been described and shown in the accompanying drawings, it is to be understood that such embodiments are merely illustrative and not restrictive, and that the embodiments are not restricted to the specific constructions and arrangements shown and described since modifications may occur to those ordinarily skilled in the art.

What is claimed:

1. A transmission system comprising:
   a) a housing;
   b) an intermediate component rotatable relative to said housing about a first axis;
   c) a first external gear fixed relative to said housing and mounted concentrically with said first axis, said first external gear having a first number z1 of gear teeth;
   d) a first gear assembly comprising a second external gear and a third external gear, said second external gear rotatable about a second axis parallel to and offset from said first axis, said second external gear meshing with said first external gear and having a second number z2 of gear teeth, said third external gear rotatable about said second axis and fixed relative to said second external gear, said third external gear having a third number Z3 of gear teeth;
   e) a fourth external gear rotatable relative to said housing about said first axis and meshing with said third external gear, said fourth external gear having a fourth number Z4 of gear teeth,
   wherein said first, second, third, and fourth numbers of gear teeth z1, z2, z3, and z4 are selected such that z1−z2 has the opposite sign of z3−z4, said first number z1 of gear teeth differs from said second number z2 of gear teeth by 1 or 2, said third number z3 of gear teeth differs from said fourth number z4 of gear teeth by 1 or 2, and z1/z2 is not equal to z3/z4.

2. The system of claim 1, wherein said first and second external gears have gear teeth of module m1 and said third and fourth external gears have gear teeth of module m2, and (z1+z2)m1=(z3+z4)m2.

3. The system of claim 1, further comprising a counterweight attached to said intermediate component on the opposite side of said first axis from said second and third external gears, said counterweight balancing said second and third external gears about said first axis as said second and third external gears are rotated about said first axis.

4. The system of claim 1, wherein either said first number z1 of gear teeth or said second number z2 of gear teeth is the same as either said third number z3 of gear teeth or said fourth number z4 of gear teeth.

5. The system of claim 1, wherein said second and third external gears are formed as a single piece of material.

6. The system of claim 1, further comprising a plurality of gear assemblies substantially equally spaced about said first axis.

7. The system of claim 6, wherein said second and third external gears of each of said gear assemblies are angularly shifted about said second axis by an angular quantity, said angular quantity being the difference between the first number z1 of gear teeth and the fourth number z4 of gear teeth divided by the total number of said gear assemblies.

8. The system of claim 1, further comprising a motor having a case and a shaft, said case fixed relative to said housing, said shaft connected to said intermediate component.

9. The transmission system of claim 8, wherein said intermediate component is press-fit onto said shaft of said motor.

10. The transmission system of claim 1, wherein said first number z1 of gear teeth differs from said second number z2 of gear teeth by 1, and said third number of gear teeth z3 differ from said fourth number z4 of gear teeth by 1.

11. The transmission system of claim 1, wherein said first gear assembly further comprises a needle bearing mounted concentrically with said second axis and rotably supporting said third gear about said second axis, said needle bearing having first and second sides, said first and second sides each perpendicular to said second axis.

12. The transmission system of claim 1, further comprising first and second PTFE washers mounted concentrically with said second axis, said first PTFE washer mounted against a first side of said first gear assembly and said second PTFE washer mounted against a second side of said first gear assembly.

13. A transmission system comprising:
 a) a housing;
 b) an intermediate component rotatable relative to said housing about a first axis;
 c) a first rotary transmission component fixed relative to said housing and mounted concentrically with said first axis, said first rotary transmission component having a first number z1 of timing features;
 d) a first assembly comprising a second rotary transmission component and a third rotary transmission component, said second rotary transmission component rotatable about a second axis parallel to and offset from said first axis, said second rotary transmission component meshing with said first rotary transmission component and having a second number z2 of timing features;
 e) a third rotary transmission component rotatable about said second axis and fixed relative to said second rotary transmission component, said third rotary transmission component having a third number Z3 of timing features;
 f) a fourth rotary transmission component rotatable relative to said housing about said first axis and meshing with said third rotary transmission component, said fourth rotary transmission component having a fourth number Z4 of timing features,
 wherein said first, second, third, and fourth numbers z1, z2, z3, and z4 of timing features are selected such that z1−z2 has the opposite sign of z3−z4, said first number z1 of timing features differs from said second number z2 of timing features by 1 or 2, said third number z3 of timing features differs from said fourth number z4 of timing features by 1 or 2, and z1/z2 is not equal to z3/z4.

14. The transmission system of claim 13, wherein said first, second, third, and fourth rotary transmission components are external gears and said timing features are gear teeth.

* * * * *